(12) United States Patent
Schachter et al.

(10) Patent No.: US 10,204,171 B1
(45) Date of Patent: Feb. 12, 2019

(54) DATABASE CONVERSION TOOL

(75) Inventors: Marcel Schachter, Pittsburgh, PA (US); Jerome E. Sindoni, Blenheim, NJ (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 998 days.

(21) Appl. No.: 12/505,962

(22) Filed: Jul. 20, 2009

Related U.S. Application Data

(60) Provisional application No. 61/082,209, filed on Jul. 20, 2008.

(51) Int. Cl.
*G06F 17/30* (2006.01)

(52) U.S. Cl.
CPC .............. *G06F 17/30893* (2013.01)

(58) Field of Classification Search
USPC .......... 707/999.001, 809, 999.003, 101, 104; 715/205, 234, 235, 255
See application file for complete search history.

(56) References Cited

U.S. PATENT DOCUMENTS

| | | | | |
|---|---|---|---|---|
| 7,610,257 | B1* | 10/2009 | Abrahams ....................... | 706/62 |
| 2002/0046147 | A1* | 4/2002 | Livesay et al. ................. | 705/37 |
| 2003/0229522 | A1* | 12/2003 | Thompson et al. ............. | 705/4 |
| 2006/0031225 | A1* | 2/2006 | Palmeri ............. | G06F 17/30566 |
| 2006/0069717 | A1* | 3/2006 | Mamou et al. ............... | 709/203 |
| 2006/0229896 | A1* | 10/2006 | Rosen ................... | G06Q 10/10 705/321 |
| 2007/0076228 | A1* | 4/2007 | Apelbaum et al. ............ | 358/1.1 |

(Continued)

OTHER PUBLICATIONS

Kognitio, "Data Factory Toolkit," Copyright 2007, downloaded from http://web.archive.org/web/20071225115050/www.kognition.com/serv . . . on Jun. 10, 2010.

(Continued)

*Primary Examiner* — Syling Yen
*Assistant Examiner* — Bao G Tran
(74) *Attorney, Agent, or Firm* — Buchanan Ingersoll & Rooney PC; Robert J. Pugh

(57) ABSTRACT

A computer system for migrating human resources data from a first human resources data system to a second human resources data system. The computer system may comprise an import utility, a translation utility an export utility and a reports utility. The import utility may be for receiving first employee data from the first human resources system comprising employee attributes and applying an equivalency formula to a first employee attribute of the first data to convert the first employee attribute from a first human resources data system format to a target format. The translation utility may be for applying a translation table to the first data to generate translated data according to the target format; and storing the translated data at the target database. The export utility may be for generating an export file comprising the translated data arranged according to the second human resources data system format. The reports utility may be for receiving from a user a request to generate a report comprising requested employee attributes in at least one of the first human resources data system format, the second human resources data system format and the target format.

22 Claims, 33 Drawing Sheets

(56) References Cited

U.S. PATENT DOCUMENTS

| | | | |
|---|---|---|---|
| 2008/0126375 A1 | 5/2008 | Sattler et al. | |
| 2008/0301162 A1* | 12/2008 | Wall | G06F 17/30569 |
| 2009/0063494 A1* | 3/2009 | Amies | G06F 21/604 |
| 2009/0132955 A1* | 5/2009 | Garg et al. | 715/781 |
| 2009/0275009 A1* | 11/2009 | Hussey | G06Q 10/06 434/322 |
| 2013/0054486 A1* | 2/2013 | Eder | G06Q 10/067 705/36 R |

OTHER PUBLICATIONS

Kognitio, "Data Migration," originally downloaded from http://www.kognitio.com/kognitio_library/downloads/Data_Migration_Brochure.pdf on Jun. 18, 2008 downloaded from http://web.archive.org/web/20071219031523/www.kognitio.com/kognitio_library/downloads/Data_Migration_Brochure.pdf on Jun. 10, 2010.

"E.know.Integrator," downloaded from http://www.eknow.com/integrator on Jun. 18, 2008.

Erik Sherman, "Merging HR systems: Integrating HR technology systems during a merger or acquisition requires careful planning and an eye for detail," HR Magazine, Dec. 2005.

Premier international, "Management Summary," Copyright 2005, downloaded from www.premier-international.com/.../Comparing_Applaud_to_ETL_Tools.pdf on Jun. 10, 2010.

Premier international, "Rapid Application Development for Data Migration," Copyright 2004, downloaded from www.premier-international.com/pdf/Applaud_White_Paper.pdf on Jun. 10, 2010.

* cited by examiner

| Personal Information | Pre-Conversion | PNC Information | Retention Status |
|---|---|---|---|
| RC | 00618 | Job Number: | |
| Dept ID | OSPPP00618 | Grade: | 23 |
| Department Name | Proof/Day | Job Title: | Clerk, Oper Support |
| (Future Use) | | Officer Title: | None |
| (Future Use) | | FLSA Status: | |
| Work Location: | RIVER | Employment Type: | F |
| Work Address: | | Shift: | |
| Work City: | Riverdale | Date in Job: | 05/24/2004 |
| Work State: | MD | Performance Rating: | 3 |
| Work Zipcode: | | Last Review Date: | 07/11/2004 |
| Work Phone: | 301/887-4283 | Next Review Date: | 07/11/2005 |
| Manager Name: | Bruce Wayne | Annual Salary: | $50,000 |
| Standard Hours: | 40 | Hourly Rate: | |
| Seniority Date: | 07/07/1992 | Base Salary Effective Date: | 07/11/2004 |
| Current Status: | A | Hourly/Salaried: | H |

| Search Criteria | Report Column Selection |

Search Condition Type: ⦿ Field ○ Formula — 2508

And / Or: ⦿ And ○ Or — 2602

Field: ▼ — 2510
☑ Force data to text

Comparator: Equals ▼ — 2512
↳ 2513
☑ Force values to text

Field Value(s): Add Field Criteria — 2514

(@Text(AcqFLSAStatus) = "Exempt")
And (@ Text(AcqStatus) = "A") — 2516

Delete    Clear all

FIG. 26

ACQUISITION DATABASE - EXCEL REPORT WRITER (Advanced Version) ← 2500

* Enter the report title (within the brackets to the right): 「 Missing Logon IDs 」 ← 2502
Comments regards to Report Usage and Functionality: 「 」 ← 2504
Report Last Run On: 06/22/2009 10:17:50 AM

| Search Criteria | Report Column Selection |

Search Condition Type: [⦿ Field  ○ Formula] ← 2508

And / Or: [⦿ And  ○ Or] ← 2602
「 」 ← 2702

[Add Field Criteria] ← 2514

(HRLogonID="") ← 2516

[Delete]                                         [Clear all]

FIG. 27

ACQUISITION DATABASE - EXCEL REPORT WRITER (Advanced Version)

* Enter the report title (within the brackets to the right): 『 Missing Logon IDs 』 ← 2502
Comments regards to Report Usage and Functionality: 『 』 ← 2504
Report Last Run On: 06/22/2009 10:17:50 AM

| Search Criteria | Report Column Selection |

Column Type: ⊙ Field Value  ○ Formula  ○ Static Text — 2806

Field Name: 『 』 ▶ — 2808                    [ Add ] — 2807

Column Selection List: — 2810

| AcqStatus |
| Full Name |
| HRLogonID |
| NCCLoginID |
| NCCTransfer |
| PNCNotesMail |
| AcqEmpID |
| SSNO |

[ Remove Selected ]
[ Remove All ]

Acquisition Database

PNC — 2902  2904  — 2906  2908  2910

Acquisition Info
• By Name

PNC Info
• By Name

Import View

Exit

| Employee Name | SSN | Dept ID | Dept Name | Job Title |
|---|---|---|---|---|
| Morgan, John T. | 111111111 | A123456 | Management | Associate |
| Hale, Eugene | 222222222 | B258258 | Banking | Manager |
| Sherman, John | 333333333 | Z456456 | Sales | Assistant |
| Pugh, James L. | 444444444 | G555444 | Valley | Associate |
| Frye, William P. | 555555555 | I3535353 | Payroll | Manager |
| Brice, Calvin S. | 666666666 | W487558 | Administration | Assistant |
| Jones, James K. | 777777777 | J4544545 | Office Support | Associate |
| German, Arthur P. | 888888888 | G797921 | Laborer | Manager |
| Mitchell, John H. | 999999999 | L438144 | Instructor | Assistant |
| Berry, James H. | 1212121212 | JU58686 | Clerk | Associate |
| Gibson, Charles H. | 1313131313 | DG1114 | Typist | Manager |
| McBridge, George W. | 2121212121 | YK186 | General Services | Assistant |

Using database on pncpghd33/PGH/DEV/PNC

*FIG. 29*

DATABASE CONVERSION TOOL

PRIORITY CLAIM

This application claims the benefit of U.S. Provisional Application Ser. No. 61/082,209 filed on Jul. 20, 2008, which is incorporated herein by reference in its entirety.

BACKGROUND

In a merger, acquisition, or other combination of two companies, all of the data and records from the combined companies must be merged into a single usable conglomeration. Often, this means migrating human resources and other records from the database(s) of one or more of the combined companies into a consolidated database, which may be either a new database, or the legacy database of one of the combined companies. Additional issues arise when human resources data is migrated. In addition to migrating the data, it is often necessary to facilitate staffing decisions regarding the pay-grade, vacation time, department, employment status, and other information about the employee after the combination.

In the past, migration of human resources data was accomplished with a great deal of complexity. First, export files were created from the human resources data of the company or companies whose data is to be migrated (the "migrating company" and/or the "migrating data"). Then the export files were manually translated according to the language and/or format of the destination company and/or database (the "target company" and/or the "target database"). For example, code was generated from scratch to bridge the differences between the migrating company's database and the target database. For each database and/or file format used by the migrating company, a different coded tool was generated from scratch to handle the migration. Once migration was completed, separate custom-coded agents were developed to generate from the target database files suitable for other departments and/or vendors of the target company including, for example, payroll, information systems, etc.

FIGURES

Various embodiments of the present invention are described here by way of example in conjunction with the following figures, wherein:

FIG. 5 illustrates one embodiment of a screen showing pre-conversion demographic data for a single employee.

FIG. 9 illustrates one embodiment of a screen showing pre-conversion job and compensation information describing a single employee.

FIG. 10A illustrates one embodiment of a screen illustrating an alternate combination of pre-conversion employee data

Figure 13A:
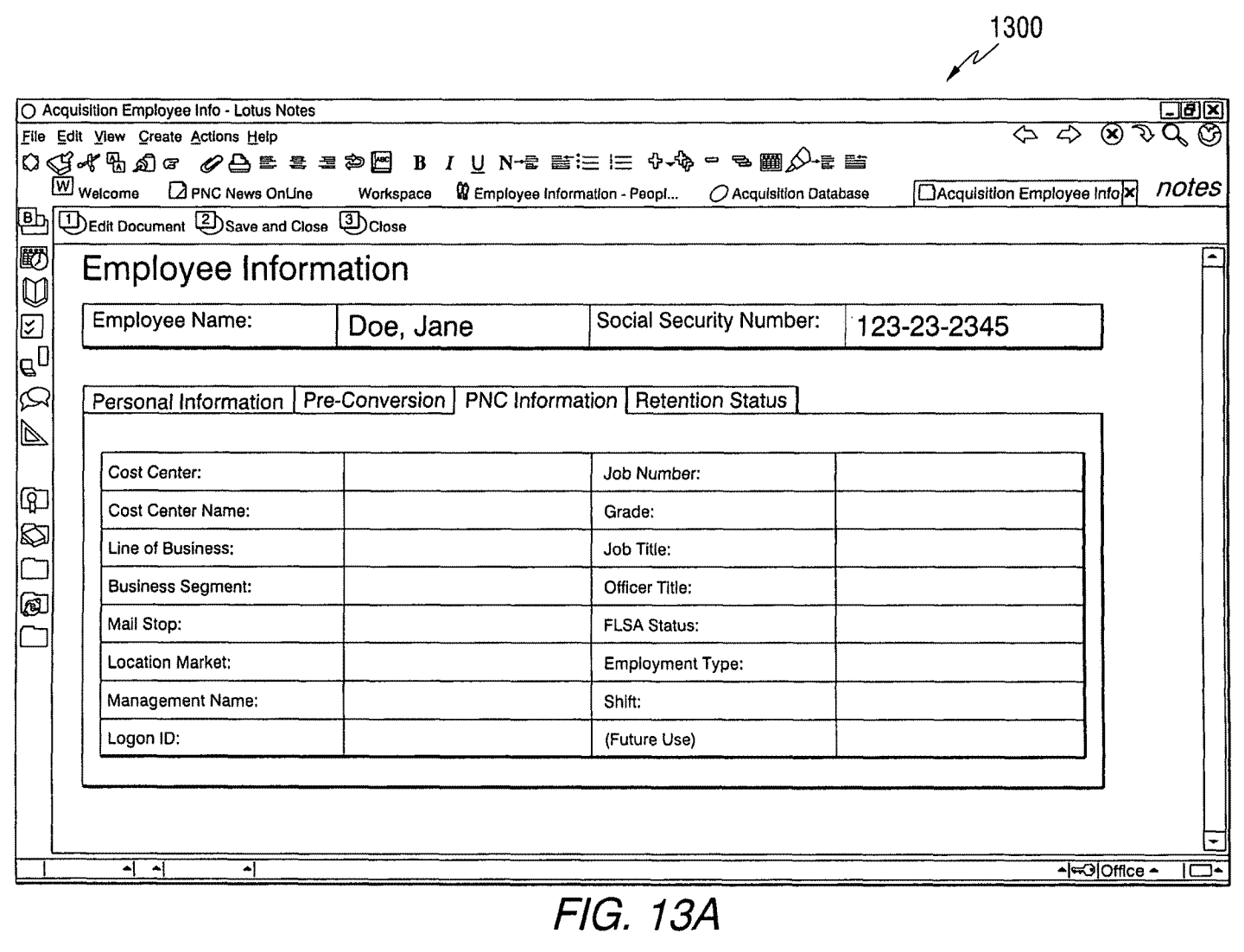

FIG. 13A illustrates an alternate embodiment of the screen of FIG. 13.

Figure 14:
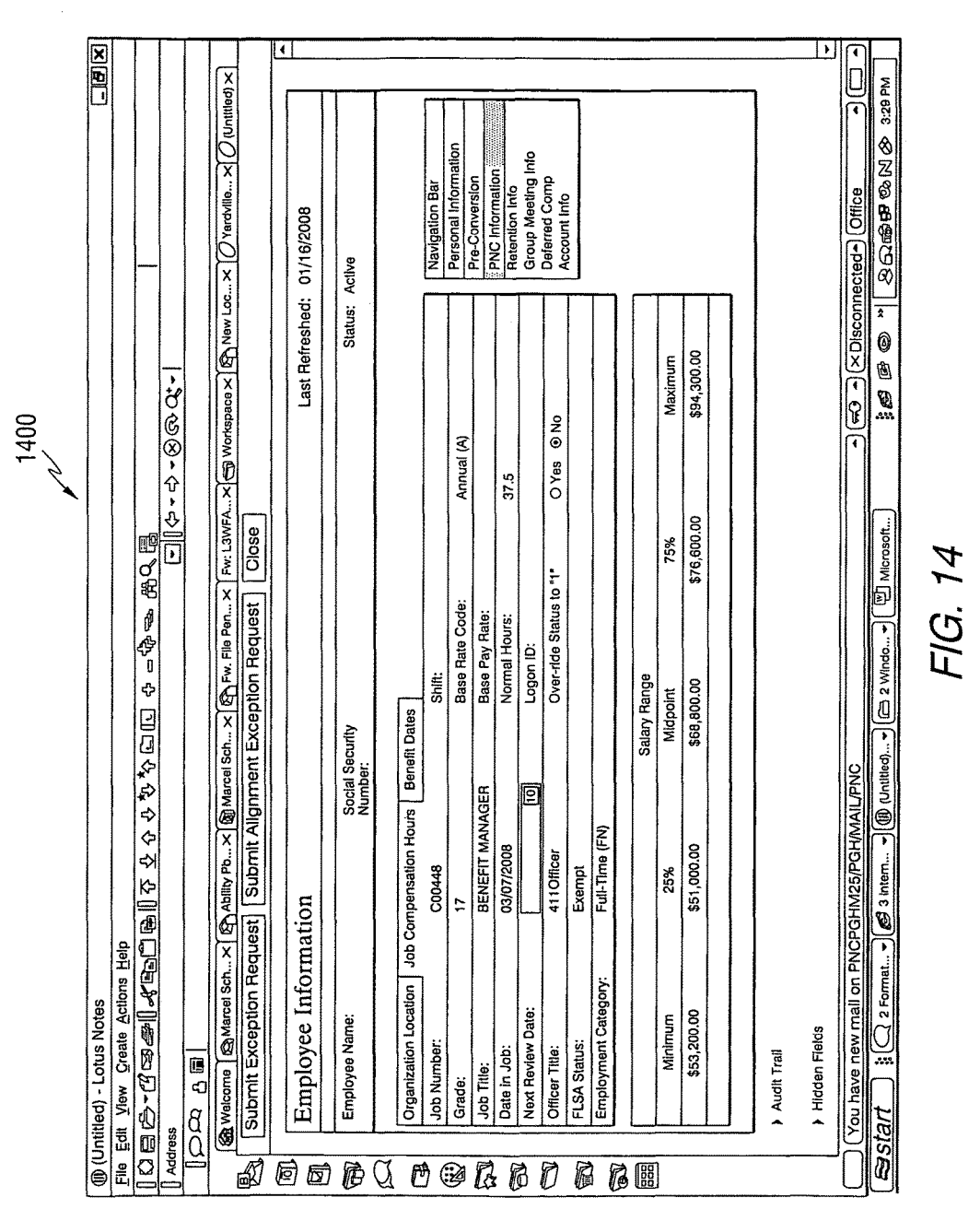

FIG. 14 illustrates one embodiment of a screen showing post-conversion employee job/compensation data.

Figure 15:
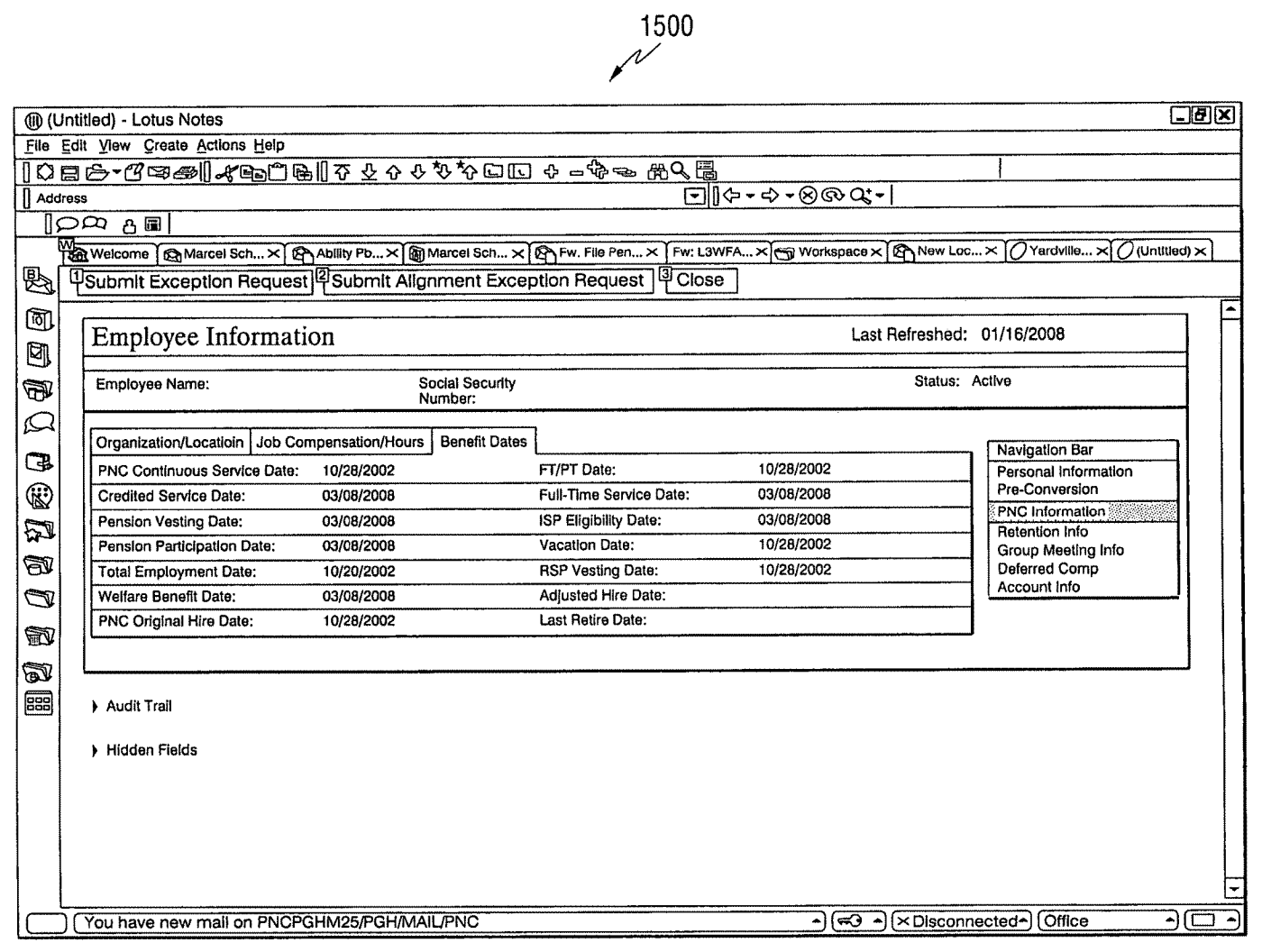

FIG. 15 illustrates one embodiment of a screen showing post-conversion benefits dates for an employee.

FIGS. 24-28 show screens illustrating one embodiment of a report generating interface.

FIG. 29 illustrates one embodiment of a report generated by the report utility.

DESCRIPTION

Various embodiments are directed to systems and methods for migrating data from a first database to a second database (e.g., from a first human resources data system to a second human resources data system). Such migrations may be desirable, for example, during a merger or other combination of companies and/or during an upgrade from one human resources (HR) system to another. According to various embodiments, a migration tool may comprise an import utility, a translation utility, an export utility and a report utility. Each of the utilities may have features that, collectively, facilitate the translation process in a comprehensive and repeatable manner.

Figure 1:
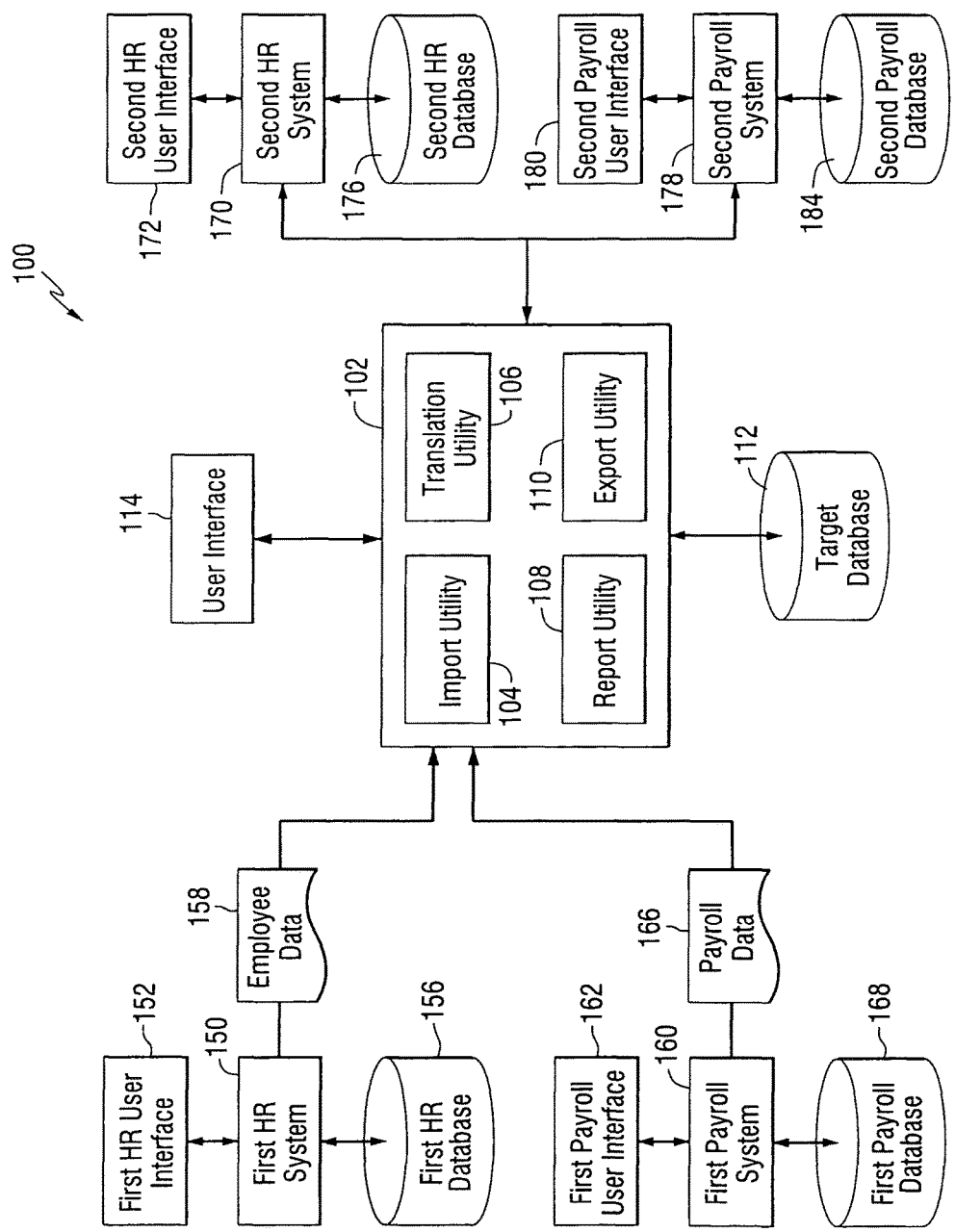
FIG. 1 illustrates a diagram of a network comprising one embodiment of a database conversion system.

FIG. 1 illustrates a diagram of a network 100 comprising one embodiment of a data migration system 102. The system 102 may be in communication with pre-conversion HR systems 150, 160 and post-conversion HR systems 170, 178. It will be appreciated that the HR systems 150, 160, 170, 178 may be any suitable type of HR systems. For example, systems 150 and 170 may be standard HR systems comprising employee personal information, benefits information, emergency contact information, etc. Also, for example, systems 160 and 178 may be payroll systems dedicated to administering the payroll function. Any of the systems 150, 160, 170, 178 may be implemented in-house by an employer or, in various embodiments, may be out-sourced to an outside vendor (e.g., a payroll vendor). According to various embodiments, the HR systems 150, 160 may comprise an information technology (IT) system that may administer access to company computer resources.

The HR systems 150, 160, 170, 178 may be implemented with any suitable type of computer device or devices. In addition, each of the HR systems 150, 160, 170, 178 may comprise an associated database 156, 168, 176, 184 and may provide a user interface 152, 162, 172, 180. The databases 156, 168, 176, 184 may store employee data/attributes in the format of the respective system 150, 160, 170, 178. The user interfaces 152, 162, 172, 180 may provide users (e.g., administrative users) with capability to view and modify employee data stored at the systems 150, 160, 170, 178 and administer the performance of HR functions (e.g., payroll, benefit management, etc.). The various systems 150, 160, 170, 178 may be in electronic communication with the data migration system 102 via any suitable type of wired, wireless or mixed network (not shown) including, for example, any local area network (LAN), any wide area network (WAN) (e.g., the Internet).

The data migration system 102 may be implemented by any suitable type of computer device or devices. For example, the system 102 may be implemented by one or more servers (not shown). According to various embodiments, the system 102 may be in communication with a target database 112 and may implement a user interface 114. The user interface 114 may allow users (e.g., database administrators, information technology (IT) professionals, and/or HR personnel) to monitor and modify the migration process.

The data migration system 102 may comprise an import utility 104, a translation utility 106, an export utility 110 and a report utility 110. The import utility 104 may receive employee data 158, 166 from the pre-conversion HR systems 150, 160 and load it to the target database 112. Data received by the import utility 104 may be in any of a variety of formats including, for example, a MICROSOFT EXCEL spreadsheet, or other spreadsheet, a SQL database, or other database, etc. According to various embodiments, the import utility 104 may comprise functionality for performing some data translations. For example, the import utility 104 may apply one or more equivalency formulas to some of the data 158, 166 to transition various data fields from the formats of the HR systems 150, 160 to a format of the target database 112 (e.g., a target format). The translation utility 106 may translate the employee data 158, 166 from the formats of the HR systems 150, 160 to the target format of the target database 112. According to various embodiments, the translation utility 106 may implement a table-based translation. For example, a translation table may establish that the migrating company's position X, having pay-scale Y and vacation attribute Z corresponds to the target company's position A having pay-scale B and vacation attribute C. Other data may be similarly translated including, for example, officer titles, cost centers, location codes, etc.

Upon receiving the translation table or tables, the translation utility 106 may apply the table or tables to the employee data 158, 166 to perform the translation.

The export utility 110 may generate files and/or other data structures from the target database 112. For example, files generated by the export utility 110 may be specifically formatted for the HR systems 170, 178 (e.g., by positioning and ordering translated data from the target database 112). The report utility 108 may be utilized to create reports in any suitable form that may give HR users, information technology users and other users easy access to, for example, pre-conversion and post-conversion data. According to various embodiments, the report utility 108 may also have table-based calculation and formula capability. For example, the report utility 108 may receive a request for certain data that is not directly available from the target database 112, but may be derived from data that is present at the target database 112. The report utility 108 may derive the requested data and include it in the requested report.

Figure 2:
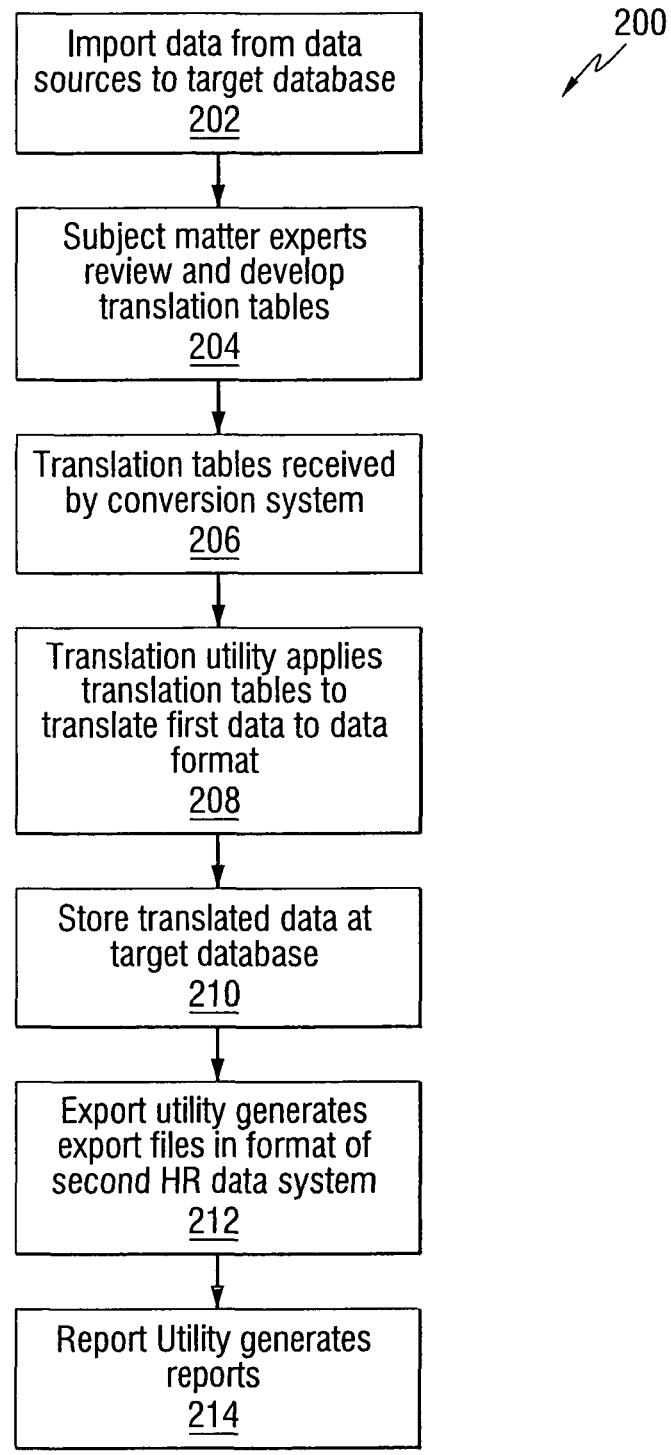
FIG. 2 illustrates a chart showing one embodiment of a process for implementing a data migration utilizing the system of FIG. 1.

FIG. 2 illustrates a chart showing one embodiment of a process 200 for implementing a data migration utilizing the system 102. At step 202, the migration system 102 (e.g., via the import utility 104) may receive employee data 158, 166 from one or more of the pre-conversion HR systems 150, 160. The employee data 158, 166 may comprise values for attributes describing employees managed by the pre-conversion systems 150, 160. For example, the employee data 158, 166 may comprise the name, position, salary, location, employment status, etc., of various employees. When the conversion is conducted to migrate data from a legacy system to a new system, the employee data 158, 166 may describe employees managed by the legacy system. For example, after a merger, employee data from one of the merged parties may be migrated to the HR systems of the other party. In some mergers, employee data from both parties' HR systems may be migrated to one or more new systems. The import utility 104 may receive the employee data 158, 166 in any suitable file format. For example, the employee data 158, 166 may be received as a report generated by one or more of the pre-conversion systems 150 160 and/or in storage format of one or more of the pre-conversion system 150, 160. The import utility 104 may have functionality for importing data directly from a MICROSOFT EXCEL or other spreadsheet. In some embodiments, the import utility 104 may have functionality for receiving data from a SQL or other type of database (e.g., databases 156, 168). Also, according to various embodiments, the import utility may be utilized to import the tables used for translation by the translation utility and/or the import utility.

According to various embodiments, the import utility 104 may have some translation capabilities, e.g., for translating data in different forms according to one or more equivalency formulas. For example, if the migrating company expresses an employee's compensation as an hourly rate, the import utility may include functionality for converting the hourly rate to a yearly salary, a weekly salary, a monthly salary, etc., based on the target database format. Also, for example, the import utility may be able to apply uniform definitions of employee status, such as full time or part time. In one example, an equivalency may be incorporated into the import utility that employees who work more than a predetermined number of hours per week (37.5) are considered full-time. In various embodiments, the translations performed by the import utility 104 may be limited to those that can be performed with the information available at the time that the employee data 158, 166 is received. For example, some translations developed by subject matter experts may not yet be available at the time that the employee data 158, 166 is received.

At step 204, subject matter experts may review the received employee data 158, 166 (e.g., via the user interface 114) and develop translation tables to be used to translate the employee data 158, 166 to the target format. The subject matter experts may be, for example, HR personnel who are tasked with determining criteria for the translation. In the case of a merger, the subject matter experts may comprise HR personnel of the acquiring party and/or the acquired party. The translation table or tables may serve as a map that translates employee attributes from the pre-conversion systems 150, 160 to corresponding employee attributes in the target format. For example, translation tables may include mappings from the terminology, etc. of the migrating company to that of the target format.

Any suitable type of employee data may be converted. For example, employee personal data such as name, social security number, hire date, termination date, etc., may be formatted. Also, for example, employee job data may be converted. This may involve translating an employee's job title and responsibilities. For example, the format of the pre-conversion HR systems 150, 160 may include a job title, "Information Technology Specialist" with a first set of associated duties. The target format may not include an identical job title and duty set, but may include a similar position referred to as an "Information Resources Technician" with a slightly different set of duties. Accordingly, the translation table or tables may specify that employees classified as "Information Technology Specialists" in the first HR data system be formatted to "Information Resources Technicians" in the target format. Other data types that may be converted include, for example, salary, salary range, organizational data such as department name and manager, business unit, etc. It will be appreciated that any suitable programming methodology may be incorporated into the translation tables to classify, describe and/or modify the employee data 158, 166 including, for example, if-then and other programming structures.

According to various embodiments, the translation table or tables may also be configured to apply employee retention decisions. For example, the target format may comprise one or more employee attributes indicating whether an employee will be retained, whether a retained employee's role is permanent or transitional and other related information. The translation tables may provide formulaic instructions for determining an employee's retention status and related information in the target format based on the employee's attributes in the format or formats of the pre-conversion systems 150, 160. The formulaic instructions may be based on systematic methods for determining which employees will be retained based on their objective attributes that may be developed by the subject matter experts. In addition to determining an employee's retention status, the translation table or tables may also include data relationships providing instructions for displacement processing. For example, if an employee is to be terminated, a severance payment amount may be calculated based on employee attributes such as years of service, seniority, etc.

Also, according to various embodiments, the translation tables may include equivalencies and/or rules for generating computer network log-ins and/or e-mail addresses for employees whose attribute data is being migrated. For example, the table or tables may indicate that an employee's log-in and/or e-mail address is based on the employee's name and the employer's name. According to one example format, an employee named James Garfield at a company called ABC Corp would be assigned a log-in of "jgarfield" and an e-mail address of "james.garfield@abc.com."

In various embodiments, the target format may include employee attributes that have no corresponding attribute in the pre-conversion system formats. In this case, the translation table or tables may comprise a formula or other calculation for deriving the missing employee attributes from another employee attribute or attributes that are present at the pre-conversion data system 150, 160. For example, if the target company has an employee attribute indicating whether the employee is full-time or part time, and the migrating company does not, the translation utility may include functionality to look at other factors, (e.g., hours worked) and make a determination about whether the migrating employee is full time or part time. This indication would then be entered into the appropriate target company attribute. Also, in various embodiments, the translation table or tables may define a target format employee attribute in terms of one or more than one attribute from the pre-conversion system formats.

Referring back to FIG. 2, at step 206, the translation table or tables (e.g., developed by the subject matter experts) may be received by the migration system 102. According to various embodiments, the translation table or tables may be received via the input utility 104. At step 208, the migration system 102 (e.g., via the translation utility 106) may apply the translation table or tables to convert the employee data 158, 166 to the target format. According to various embodiments, the translation functionality may be based on an application of the translation table or tables to the employee data 158, 166. Accordingly, the same translation functionality may be used and re-used for different translation tables and/or employee data 158, 166. The translated employee data may be stored at the target database 112 (step 210).

At step 212, the export utility 110 may generate at least one export file in the format of a second HR data system (e.g., one or both of HR data systems 170, 178). The export utility 110 may also be used to filter and/or convert human resources data into formats that may be used for other purposes (e.g., for different departments and/or business partners of the target company). For example, the export utility 100 may extract employee data from the target database 112 and compile it into an order or form readable to the post-conversion system or systems 170, 178. For example, in one embodiment, the post-conversion system format may enable one or more of the post-conversion systems 170, 178 to generate employee e-mail addresses. In another example, the export utility 110 may extract employee LAN or network addresses and compile them into a form that may be used by a network group, for example, to generate login ID's, etc. The export utility 110 may also be functional to perform other similar tasks that aid in integrating employees of the migrating company into the target company. According to various embodiments, the export utility 110 may receive as input a request for a file, where the request defines the fields of the target database to be exported. The export utility 110 may automatically determine what kind of file is being requested, and then generate and export the file automatically.

At step 214 the report utility 108 may be utilized to generate one or more reports describing the employee data 158, 166, the translated data, and/or an export file provided to one or more of the post-conversion HR systems 170, 178. The reports may be in any suitable format and, in various embodiments, may be in a spreadsheet or other similar format. According to various embodiments, the report utility may be configured to generate at least one report based on derived employee attributes. For example, the report utility 108 may receive a request from a user to generate a report based on at least one derived employee attribute defined in terms of other pre-conversion or post-conversion employee attributes.

Figure 3:
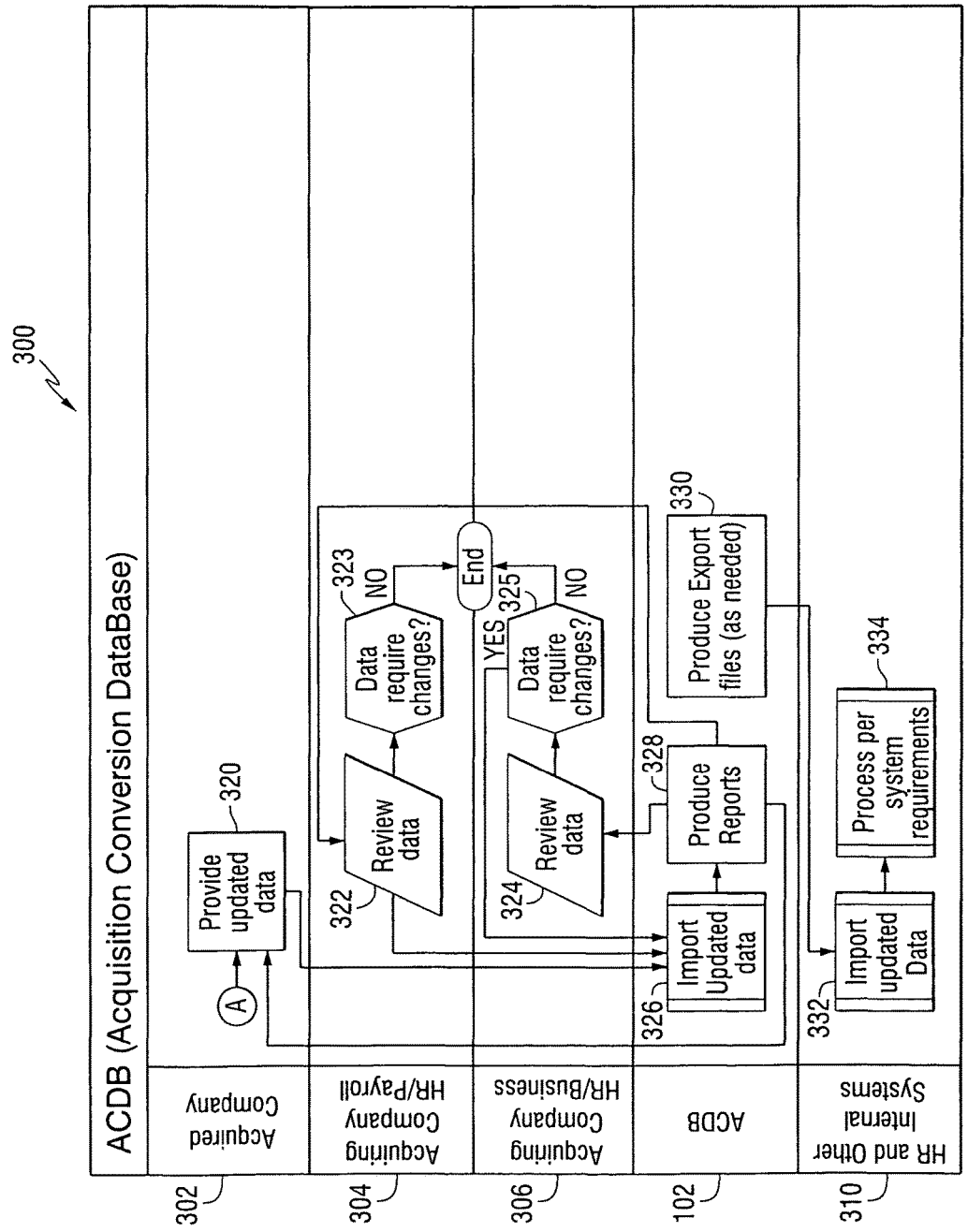
FIG. 3 shows a workflow illustrating an alternative, iterative method for utilizing the migration system of FIG. 1.

It will be appreciated that, according to various embodiments, migrating data from the pre-conversion HR systems 150, 160 to the post-conversion HR systems 170, 178 may take place in an iterative fashion. For example, FIG. 3 shows a workflow 300 illustrating an alternative, iterative method for utilizing the migration system 102. Although the example workflow 300 is provided in the context of a merger or acquisition, it will be appreciated that it may easily be adapted for non-acquisition related data migrations as well.

When an acquisition, merger or other data migration inducing event is announced, the human resources and/or information technology departments of the acquiring company (304, 306) and the target company (302) may begin communicating. The target company (304, 306) may provide a "wish list" of what kind of employee-related data the target company would like to receive. For example, the target company may want to know, for each employee, a name, social security number, etc. The migrating company may then begin to provide the requested data at step 320. Data may be imported by the migration system 102 at step 326. This process may take several iterations as the data requested and the data received are refined to meet the requirements of both sides, and as the parties gain a better understanding of each other's organization.

Next, data from the migrating company is imported at step 332. The imported data, before or after a preliminary translation, may be used to generate reports (step 328), which are provided to subject matter experts at the company HR/payroll department 304 and the acquiring company HR/business department 306. The subject matter experts may review the reports at steps 322 and 324, respectively, and define data equivalencies or definitions. For example, the subject matter experts may define which target cost center(s) should correspond to each of the migrating company cost centers. A data definition may define a target format employee attribute in terms of another pre-conversion attribute or attributes. The data equivalencies and definitions may then be captured into the tables utilized by the importation utility and/or by the translation utility. Once equivalencies and translation tables are defined, the subject matter experts may utilize the translations for various purposes including, for example, determining which employees will be retained, determining salaries, determining knowledge or retention bonuses, employee locations, etc. It will be appreciated that this process may be iterative. The translation tables may be updated accordingly.

If a change is needed (decision steps 323, 325), then new data may be imported from the acquired company 302 at step 306 and/or appropriate changes may be made to one or more translation tables. Provided that the subject matter experts find the data to be acceptable, the export utility 110 may be utilized to format the data for use by various departments and/or outside vendors including, for example, payroll, messaging, information technology, etc. (step 330). For example, the target company may receive file layouts from its payroll department and/or payroll vendor. The export utility may covert the file layouts into translation tables defining translations from the target data format.

When all desired changes are entered by the departments 304, 306, the migration system 102 may generate export files at step 330 (e.g., with the export utility 110). The export files may be provided to the HR systems 310, which may import the files (step 332) and then process the translated employee data at step 334 to perform their assigned function (e.g., payroll and/or another HR function or functions).

Figure 4:
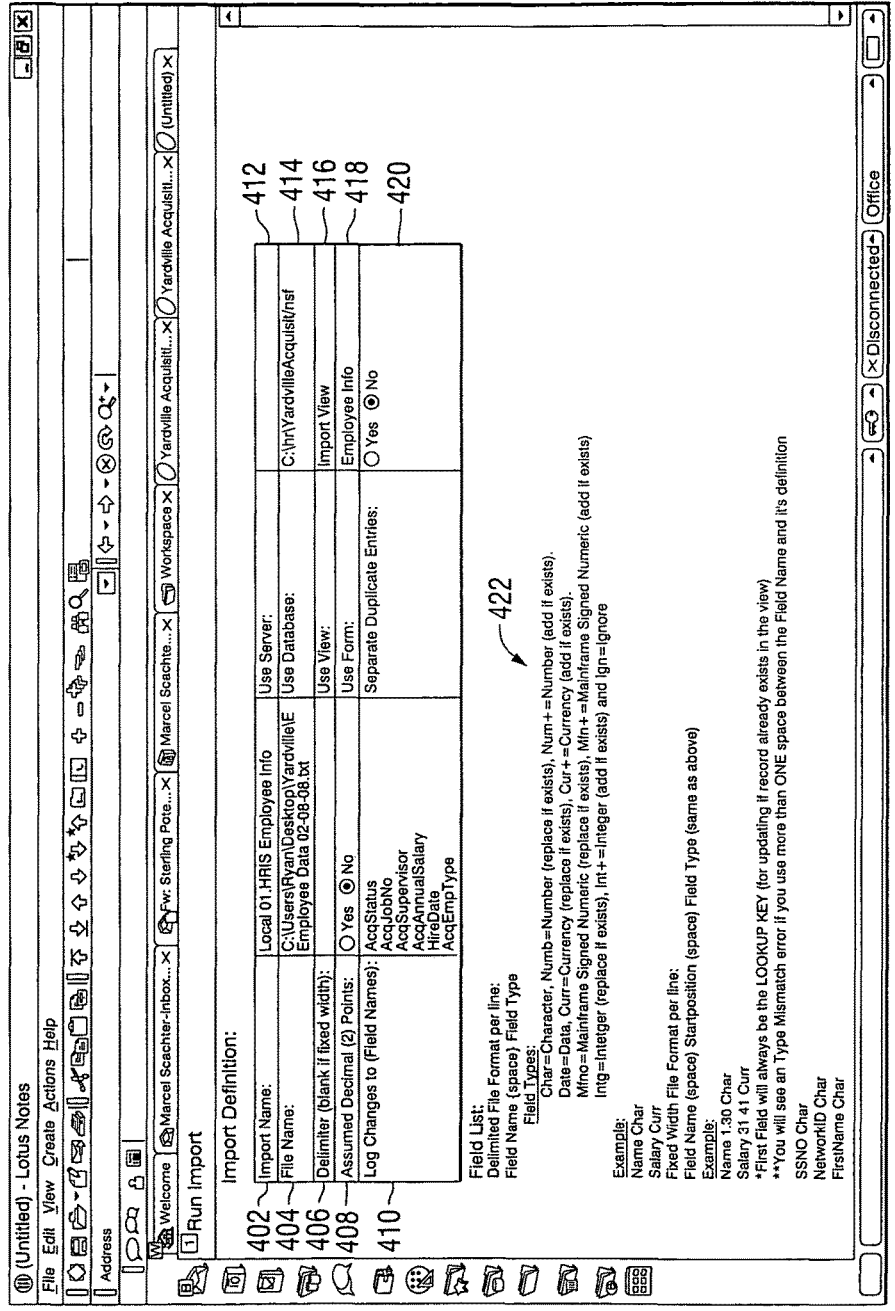
FIG. 4 illustrates one embodiment of a screen for facilitating the importation of data.

FIG. 4 illustrates one embodiment of a screen 400 for facilitating the importation of employee data 158, 166. The screen 400, for example, may be provided to a user (e.g., administrative user) of the migration system 102 by the migration system user interface 114. The screen 400 may comprise various fields where the administrative user may review and/or modify properties of an import function performed by the import utility 104. An import name field 402 may list a reference name of the import. The field 402 may indicate the logical location of the employee data file or files to be imported. For example, as shown in FIG. 4, the file to be imported is entitled "Employee Data 02-08-08.txt." A delimiter field 406 may indicate a line width of the file to be imported. If the file has a fixed line width, then the delimiter field 406 may be blank, as shown. An assumed decimal field 408 may provide instructions to the import utility 104 regarding the form of the incoming data. For example, it may be desirable for the import utility 104 to assume that the last two digits of every number represent a decimal. A field names field 410 may allow the user to specify fields of the imported file to be monitored, which changes logged. According to various embodiments, this may provide a manner for monitoring translation changes made to the imported data by the import utility 104.

A server field 412 may allow the user to specify a server that will execute the import utility 104 to handle the file import. Database field 414 may allow the user to specify a particular target database 112 where the imported data may be stored (e.g., in embodiments where there are multiple target databases of the migration system 102). View field 416 may allow the user to select a view of the imported data that may be provided to the administrative user and/or another user, for example, to generate and/or refine translation data. A form field 418 may allow a user to specify the form of the incoming data. For example, as illustrated in FIG. 4, the incoming data is "Employee Info." A separate duplicate entries field 420 may allow the user to determine whether duplicate entries in the employee data (e.g., entries describing the same employee) will be separated into multiple employee profiles or merged into a single profile. A field list 422 may indicate format equivalencies between fields according to the pre-conversion system formats and fields according to the target format.

Figure 5:
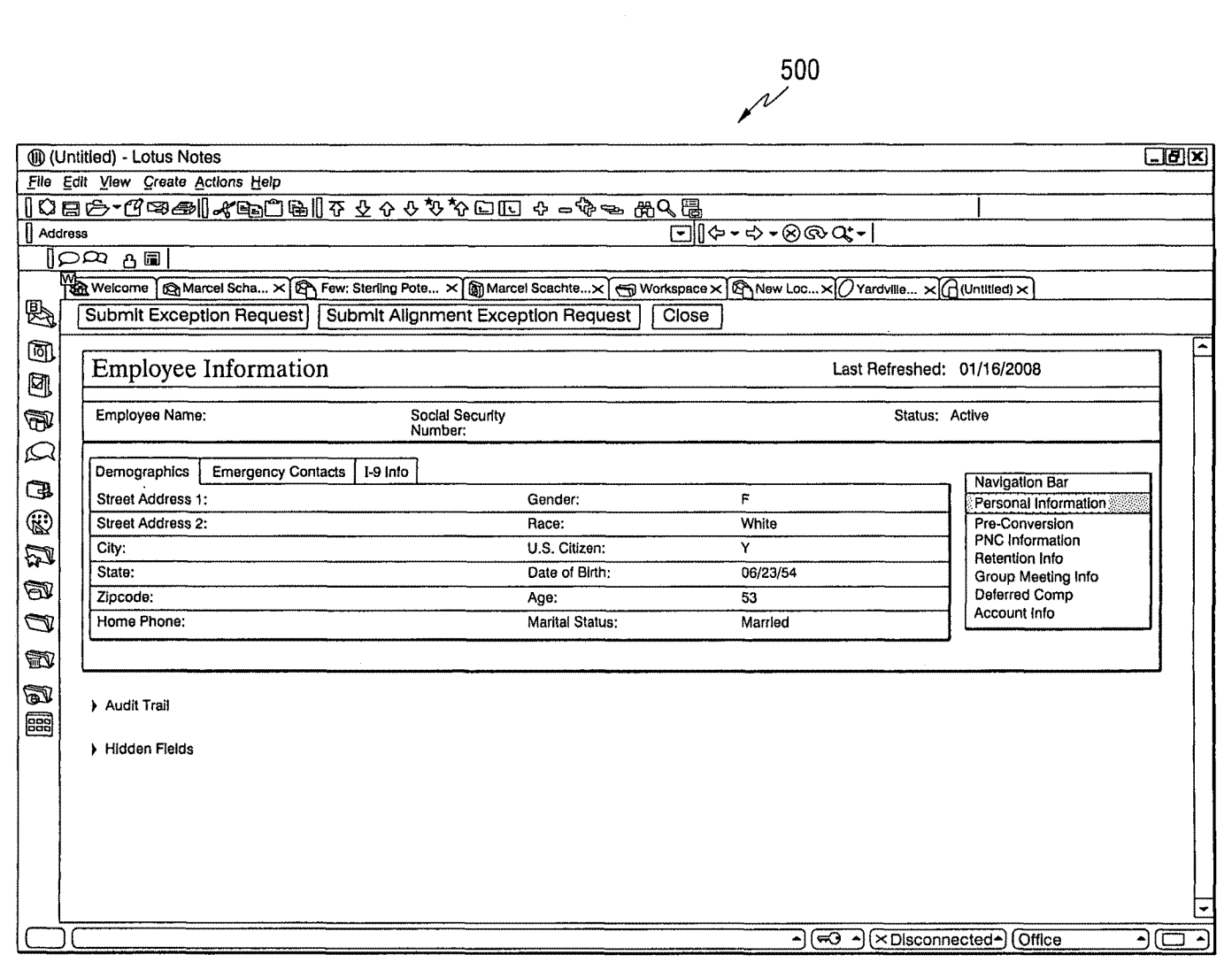
Figure 5A:
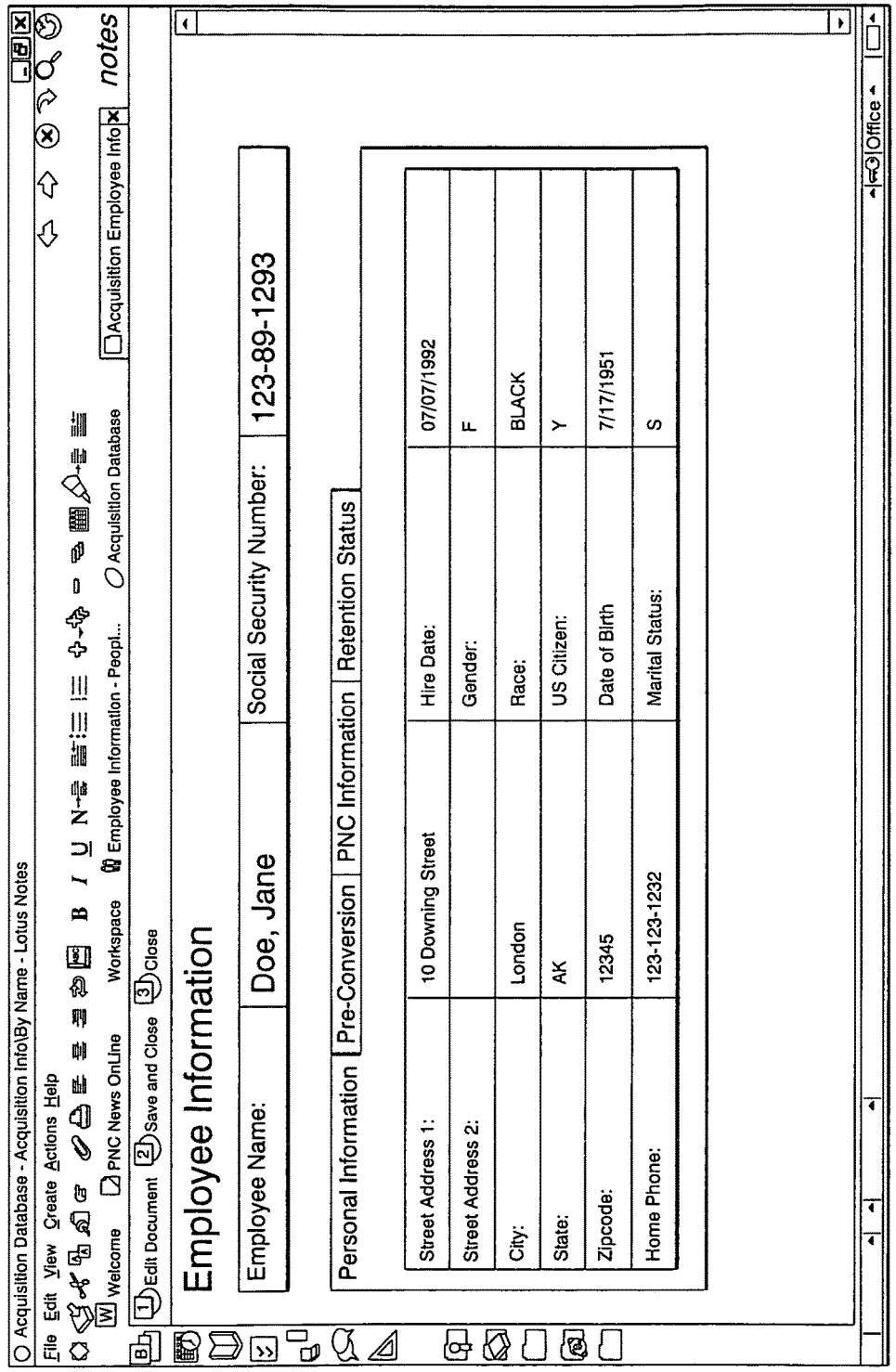
FIG. 5A illustrates an alternate embodiment of the screen of FIG. 5.
Figure 6:
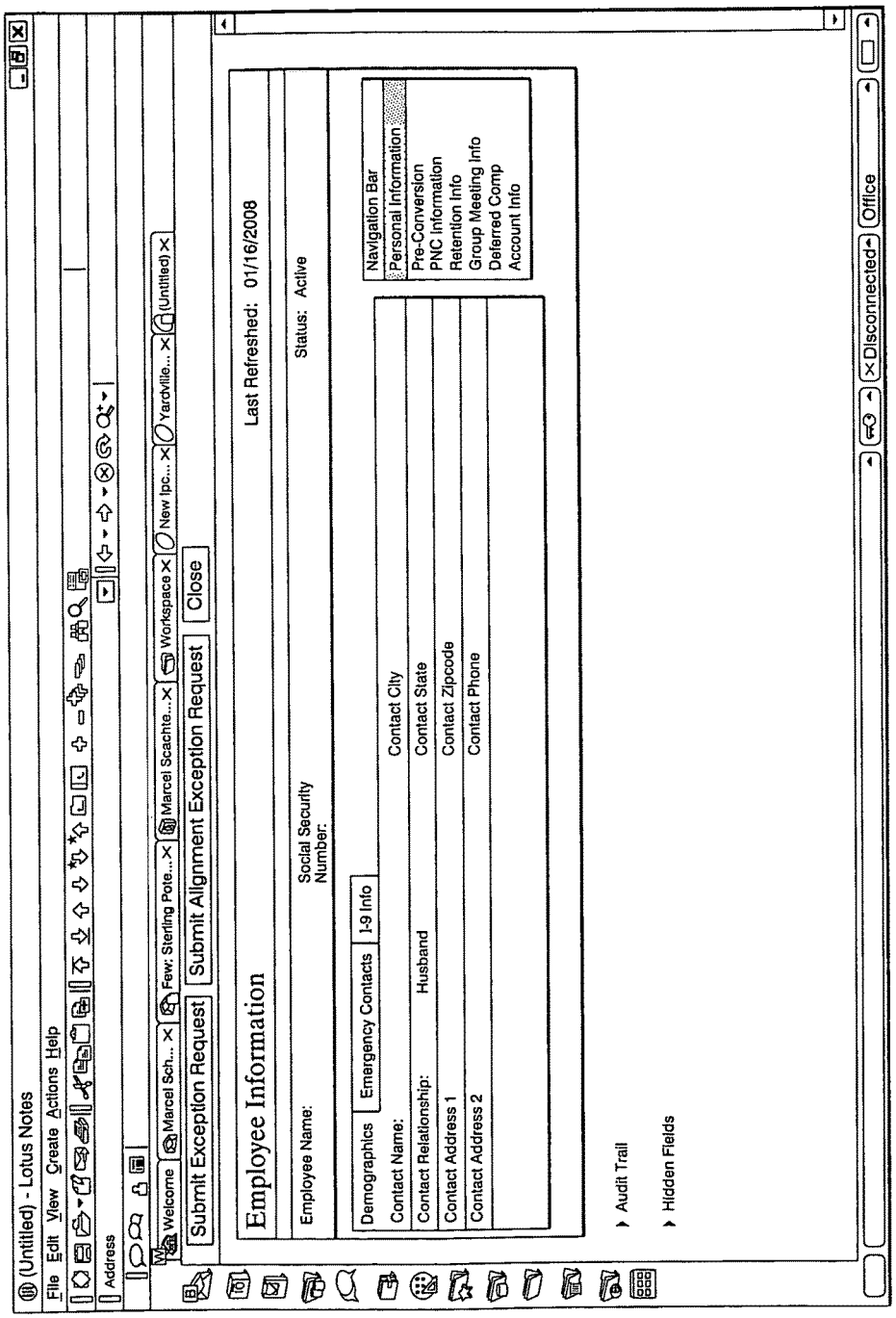
FIG. 6 illustrates one embodiment of a screen showing emergency contact data for a single employee.
Figure 7:
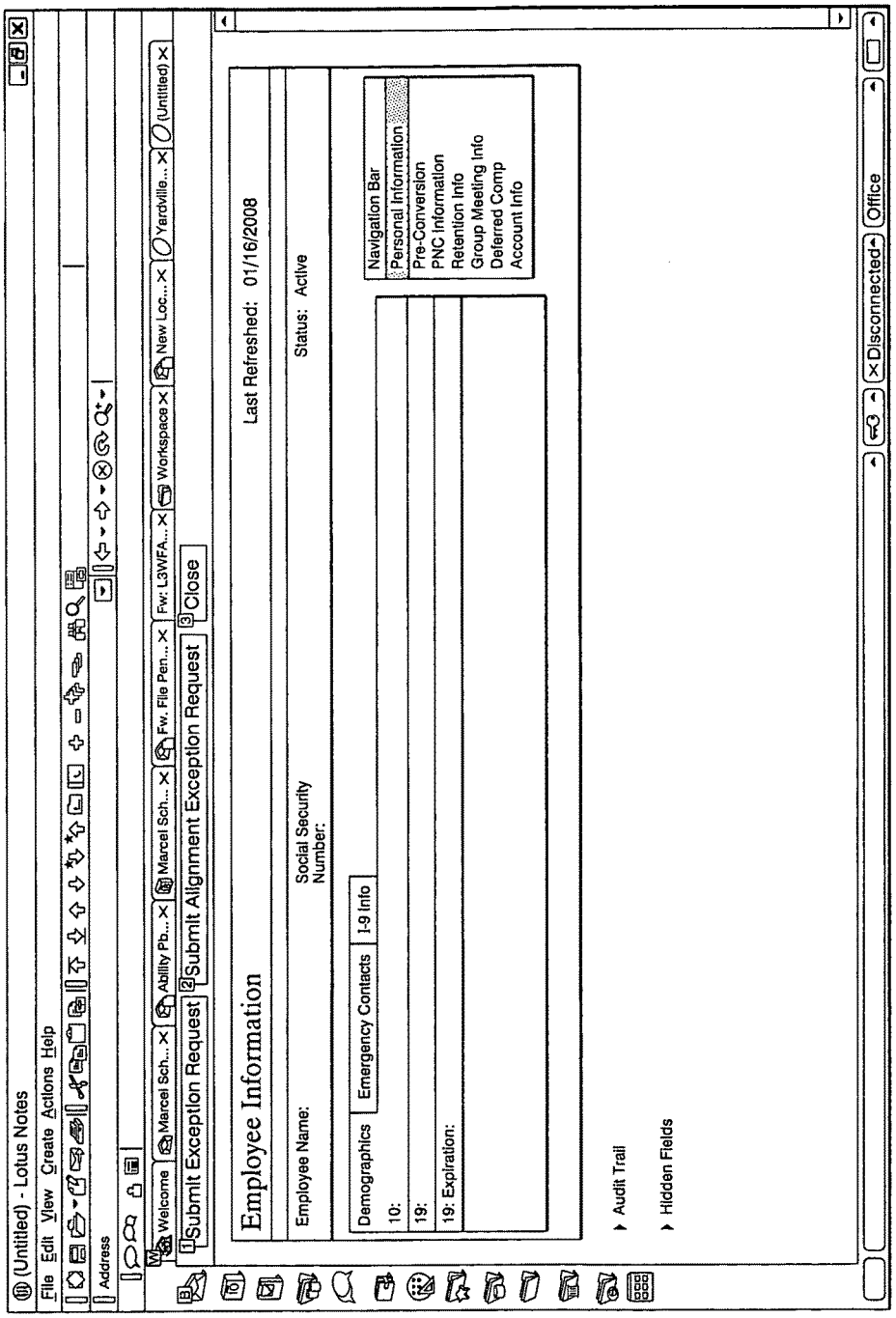
FIG. 7 illustrates one embodiment of a screen showing immigration data for a single employee.

FIGS. 5-10 illustrate embodiments of screens that may be provided to the users of the migration system 102 (e.g., via user interface 114) to indicate pre-conversion data. For example, some or all of FIG. 5-10 may represent reports generated by the report utility 108. The pre-conversion data may be data that has not been converted to the target format. For example, users of the migration system 102 may review pre-conversion data prior to conversion (e.g., to develop a translation table or tables) or after conversion (e.g., to refine a translation table or tables). FIG. 5 illustrates one embodiment of a screen 500 showing pre-conversion demographic data for a single employee. The screen 500 may list employee demographic information including, for example, home address(es), phone numbers, gender, race, citizenship, etc. FIG. 5A illustrates an alternate embodiment of the screen 500. FIG. 6 illustrates one embodiment of a screen 600 showing emergency contact data for a single employee. FIG. 7 illustrates one embodiment of a screen 700 showing immigration data for a single employee.

Figure 8:
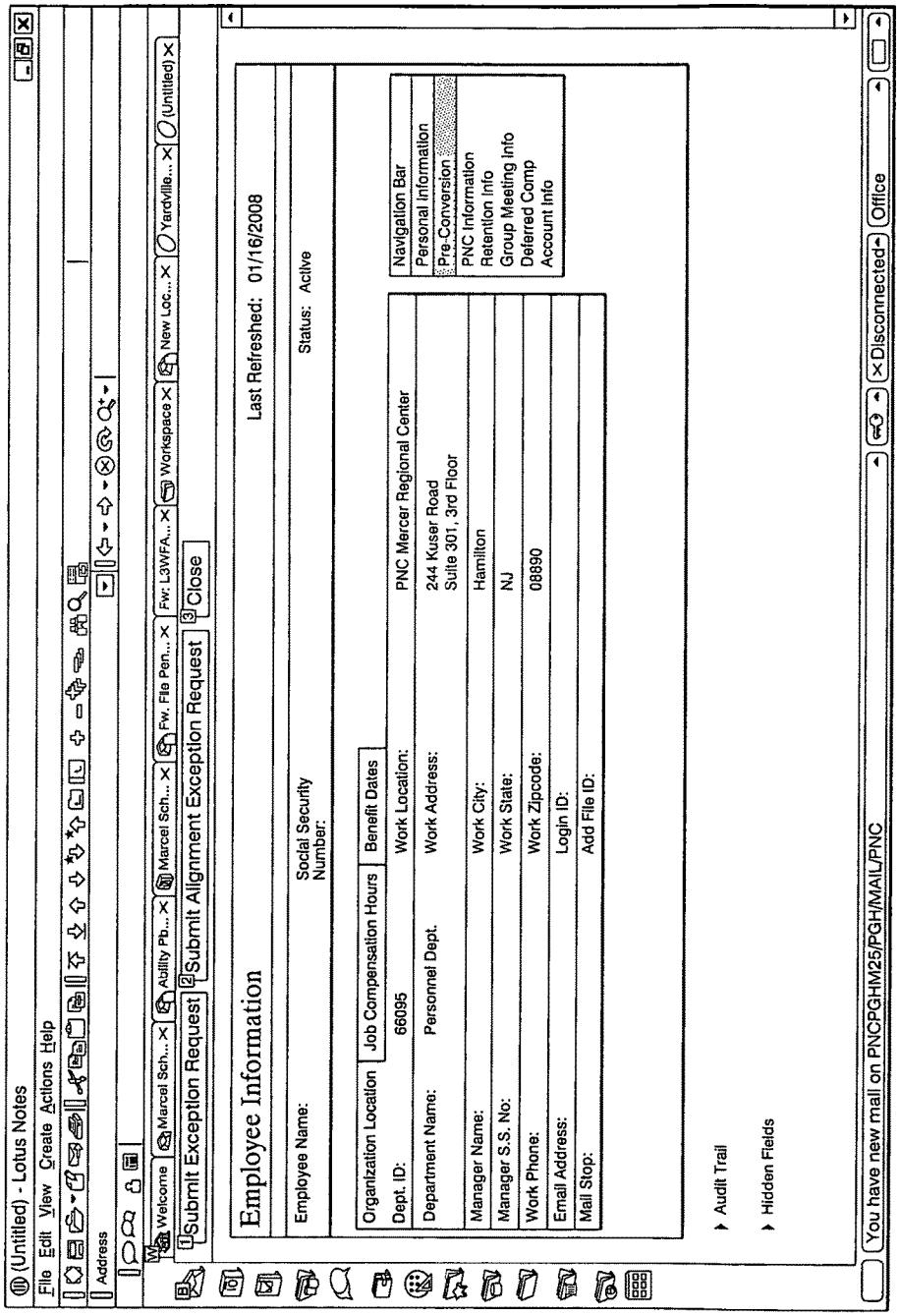
FIG. 8 illustrates one embodiment of a screen showing organization/location information describing a single employee.
Figure 9:
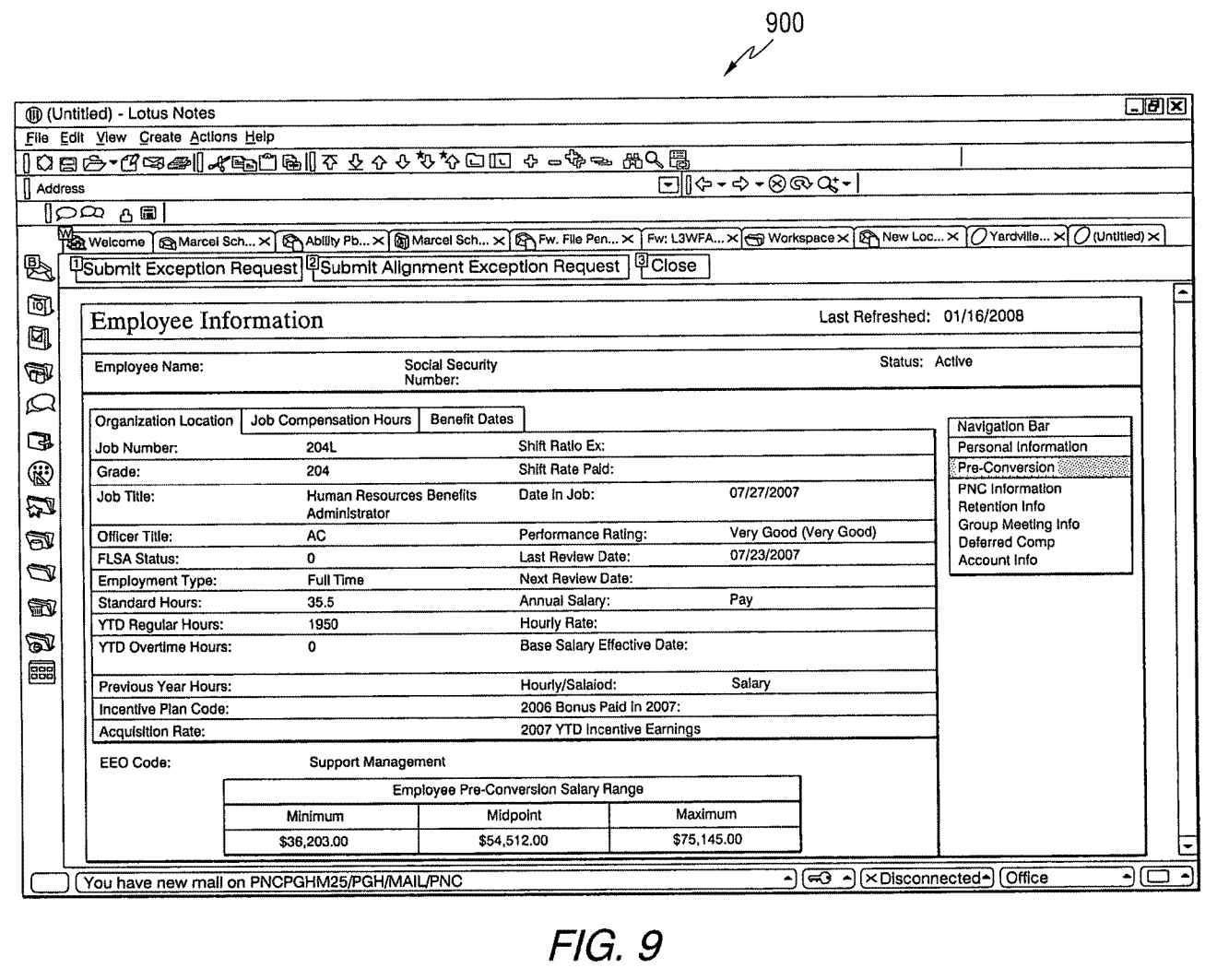
Figure 10:
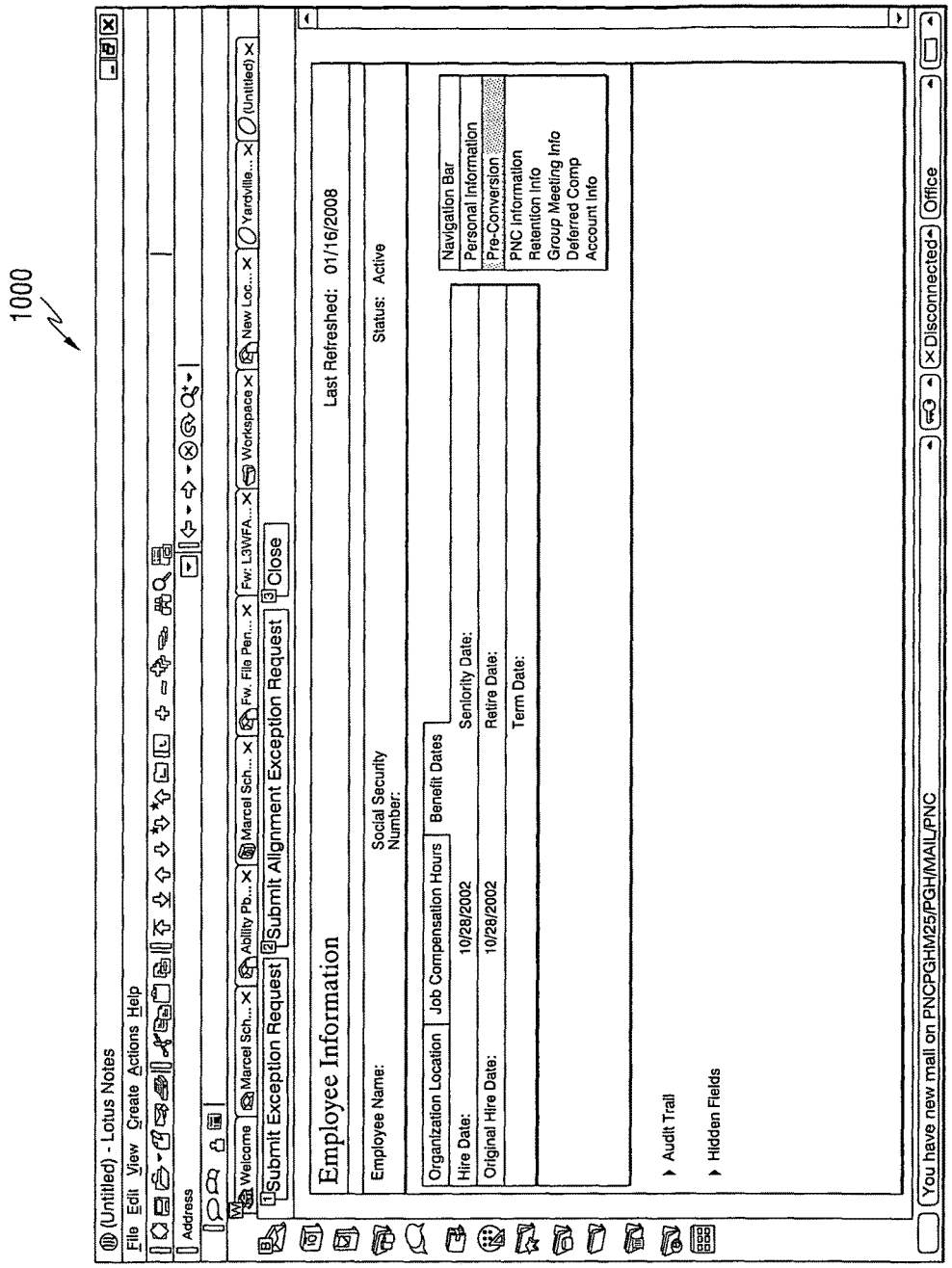
FIG. 10 illustrates one embodiment of a screen showing benefit information describing a single employee.

FIG. 8 illustrates one embodiment of a screen 800 showing pre-conversion organization/location information describing a single employee. The information shown at the screen 800 may comprise data describing an employee's position within a company (e.g., the acquired company). For example, the screen 800 may list a department, manager, work location, work contact information, etc., of an employee. FIG. 9 illustrates one embodiment of a screen 900 showing pre-conversion job and compensation information describing a single employee. Information shown by the screen 900 may include, for example, a job number and/or grade, a job title, an employment status, a number of hours per week and per year, a salary, a performance rating, etc. FIG. 10 illustrates one embodiment of a screen 1000 showing benefit information describing a single employee. Benefit information may include, for example, a hire date, a seniority date, a re-hire date, etc. It will be appreciated that FIGS. 5-10 provide examples of some types of pre-conversion data that may be acted upon by the migration system 102. It is not intended as an exhaustive list and, in various embodiments, other and/or different types of employee data may be converted. FIG. 10A illustrates one embodiment of a screen 1050 illustrating an alternate combination of pre-conversion employee data.

Figure 11:
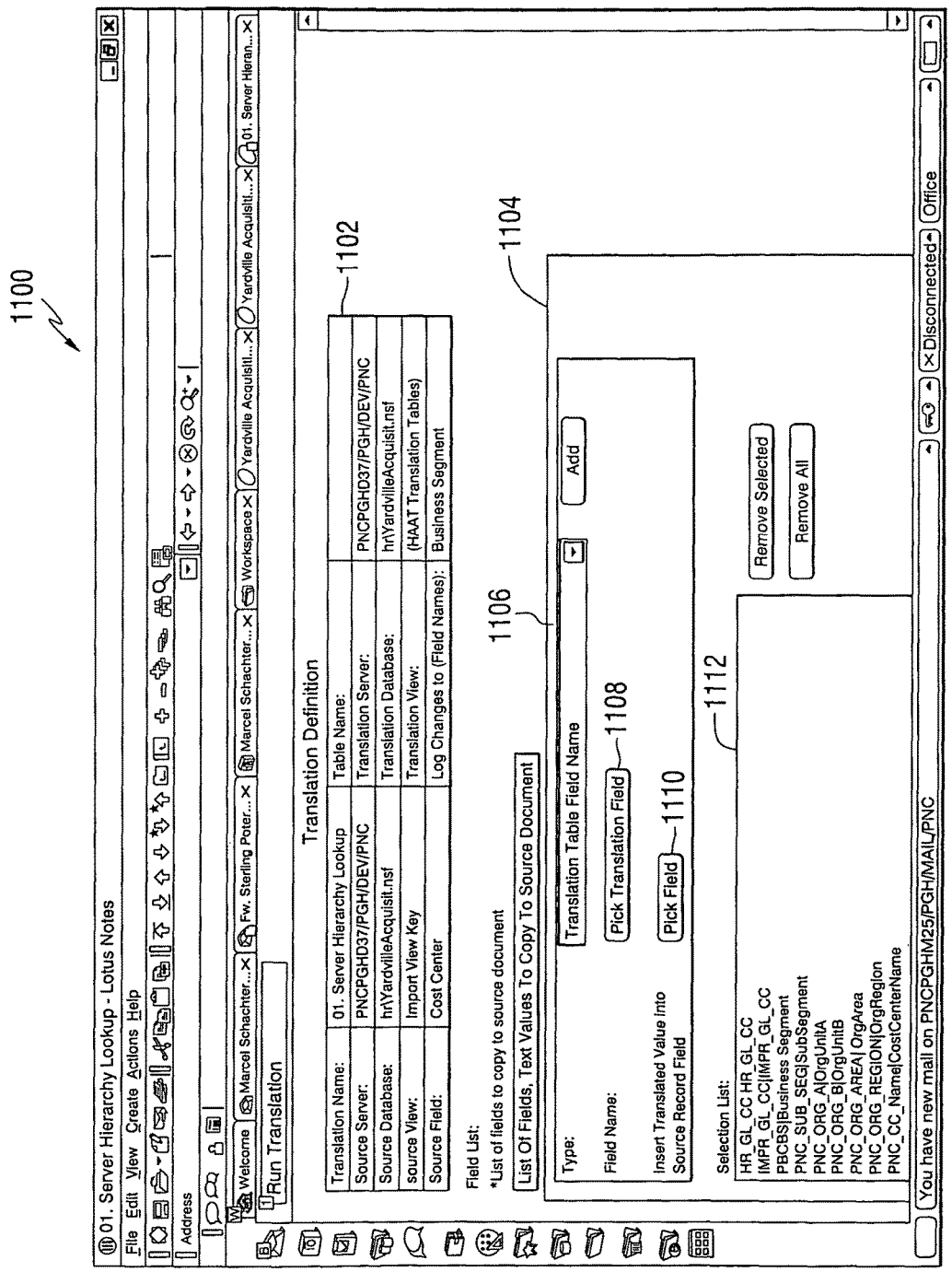
FIG. 11 illustrates one embodiment of a screen that may be shown to a user in conjunction with a translation performed by the translation utility.
Figure 12:
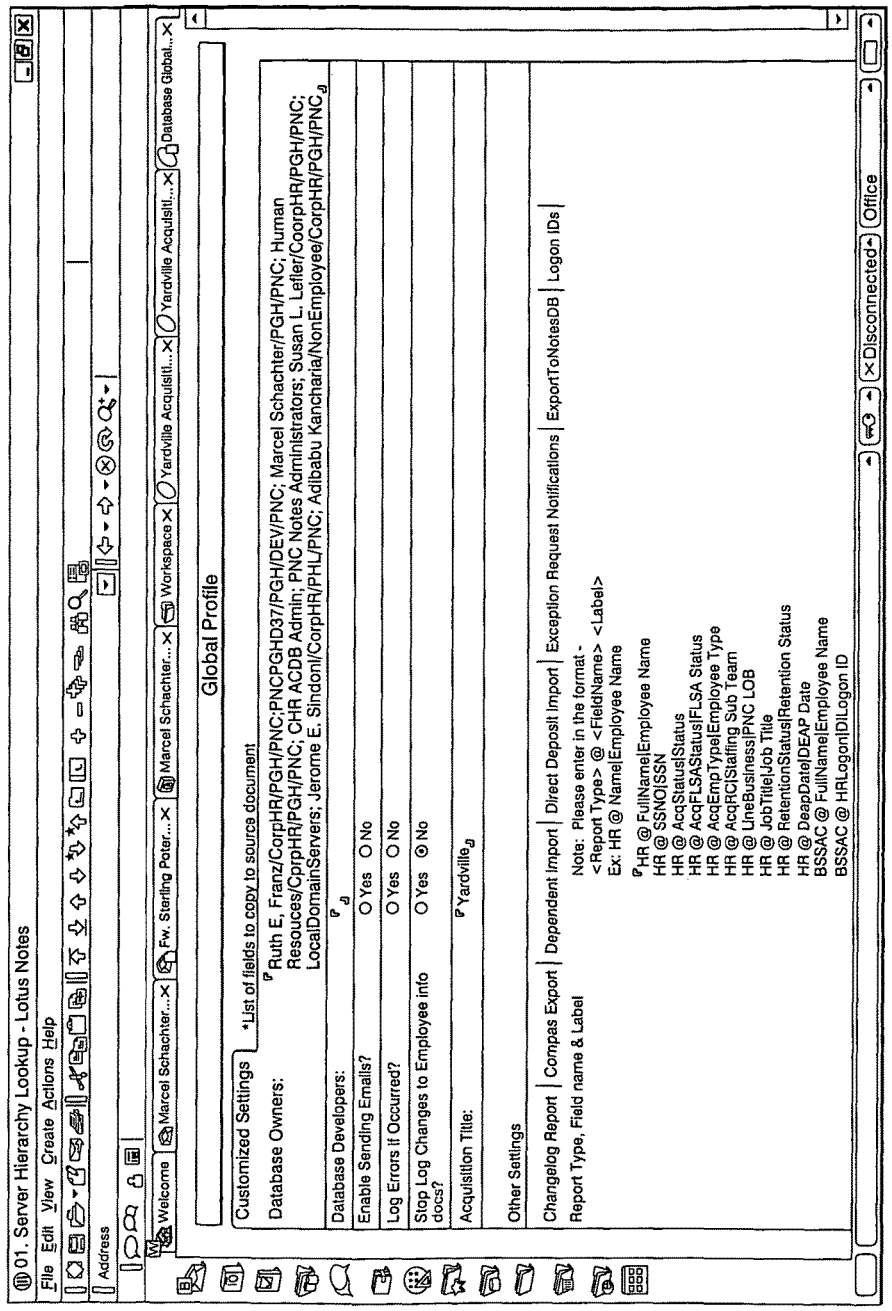
FIG. 12 illustrates one embodiment of a screen that may be shown to a user including a change log.

FIG. 11 illustrates one embodiment of a screen 1100 that may be shown to a user in conjunction with a translation performed by the translation utility 102. A translation definition field 1102 may allow the user to view and/or modify parameters of the translation including, for example, a translation name and source information such as, for example, a source server, a source database, a source view and a source field. The source server and database may indicate a location of the target database or portion thereof to be translated. The field 1102 may also include a table name, indicating one or more translation tables to be used in the conversion, as well as a translation server, database and view. The translation server may indicate the server that will apply the translation table or tables to implement the translation. The translation database may indicate the location where the translated data will be stored (e.g., a portion of the target database 112). In addition, the field 1102 may indicate database fields are set to have changes thereto logged. A translation table field 1104 may allow a user to make certain modifications to one or more of the translation tables. For example, the user may specify a source field at window 1106. A translation field may be selected by activating button 1108. A destination field (e.g., in the translated data) may be selected by choosing button 1110. Field 1112 may list fields that are configured to be translated. FIG. 12 illustrates one embodiment of a screen 1200 that may be shown to a user including a change log. The change log may indicate changes made to one or more fields of pre-conversion employee data, for example, by the import utility 104 and/or the translation utility 106.

Figure 13:
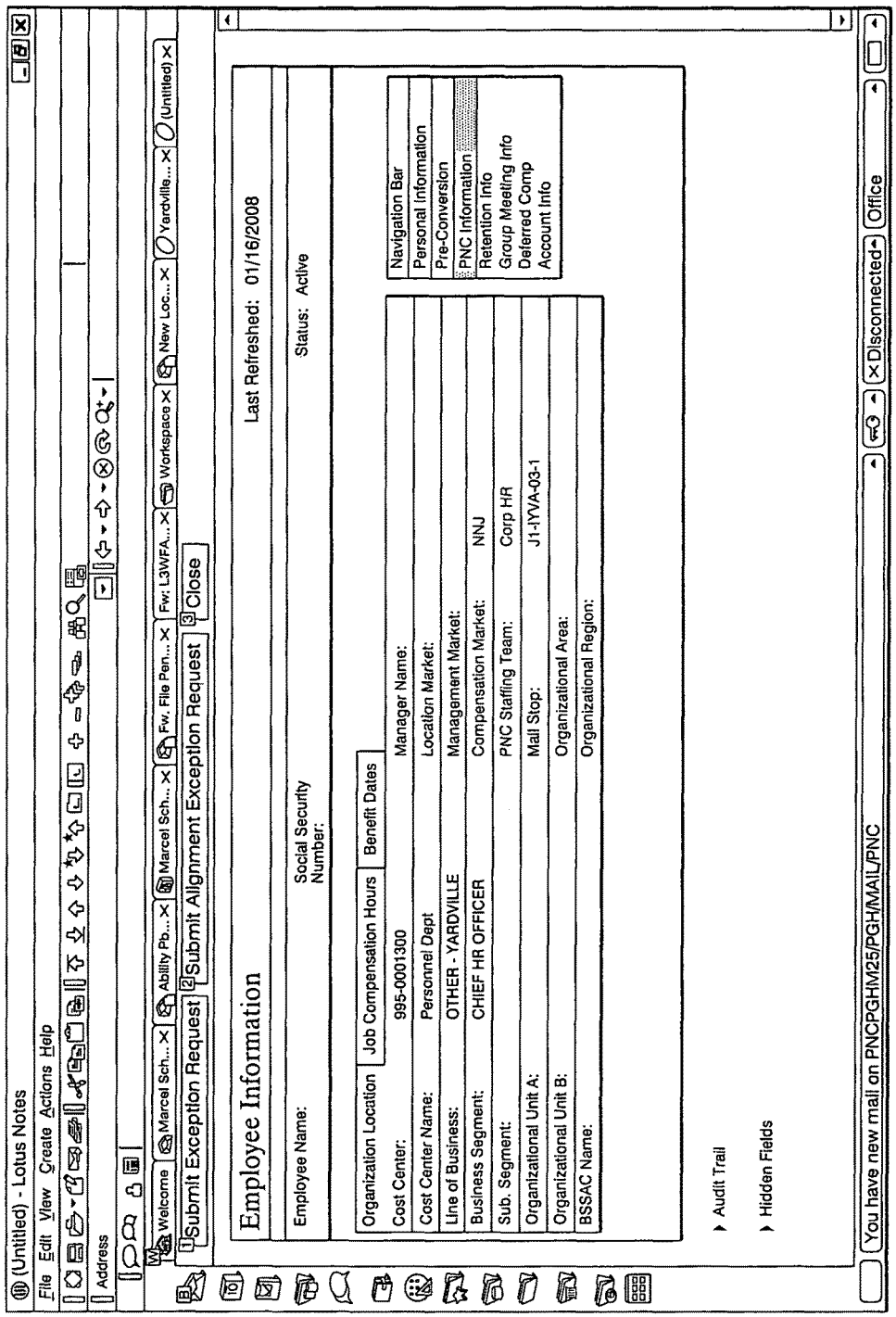
FIG. 13 illustrates one embodiment of a screen showing post-conversion employee organization/location information.

FIGS. 13-23 illustrate embodiments of screens that may be provided to the users of the migration system 102 (e.g., via user interface 114) to indicate post-conversion data that has been translated to the target format. For example, one or all of the FIGS. 13-23 may illustrated reports generated by the report utility 108. FIG. 13 illustrates one embodiment of a screen 1300 showing post-conversion employee organization/location information. For example, the screen 1300 may list cost center, line of business, organizational unit, manager, workplace location and other organizational data describing the employee post-conversion. FIG. 13A illustrates an alternate embodiment of the screen 1300. FIG. 14 illustrates one embodiment of a screen 1400 showing post-conversion employee job/compensation data. For example, the screen 1400 may show a job title, number and grade along with a salary, hours per week and other similar employee data. FIG. 15 illustrates one embodiment of a screen 1500 showing post-conversion benefits dates for an employee.

Figure 16:
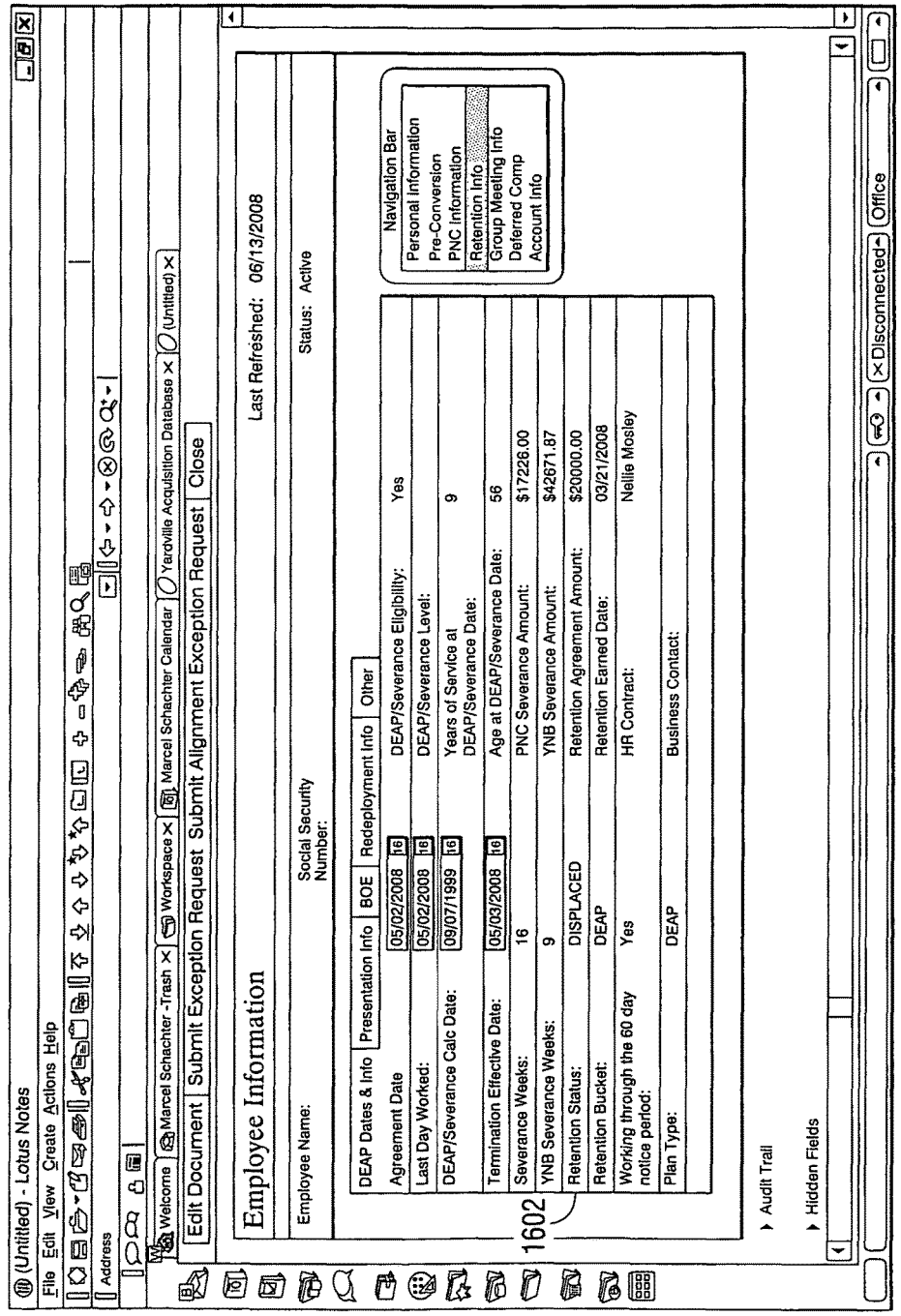
FIG. 16 illustrates one embodiment of a screen showing post-conversion employee details regarding retention.
Figure 16A:
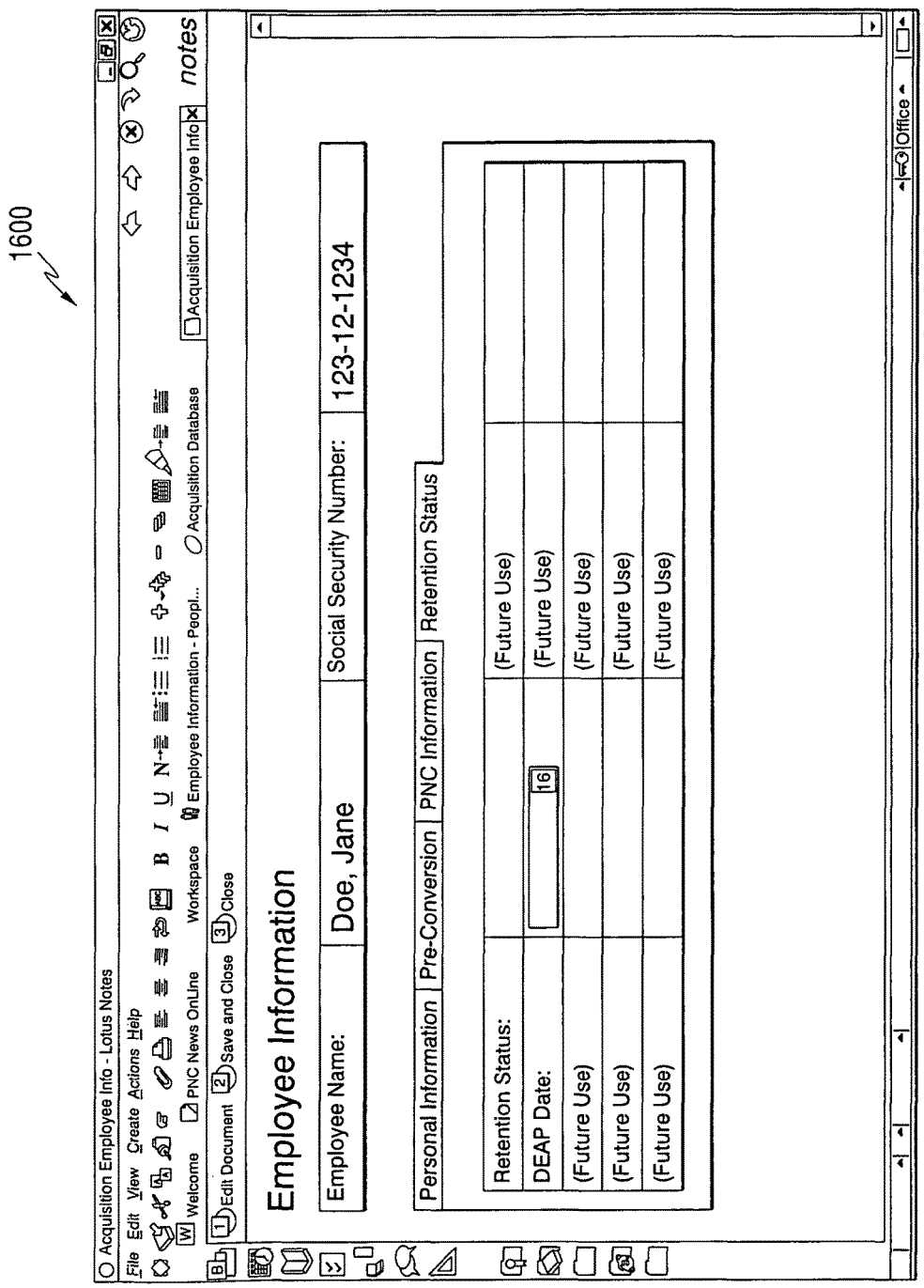
FIG. 16A illustrates an alternate embodiment of the screen of FIG. 16.
Figure 17:
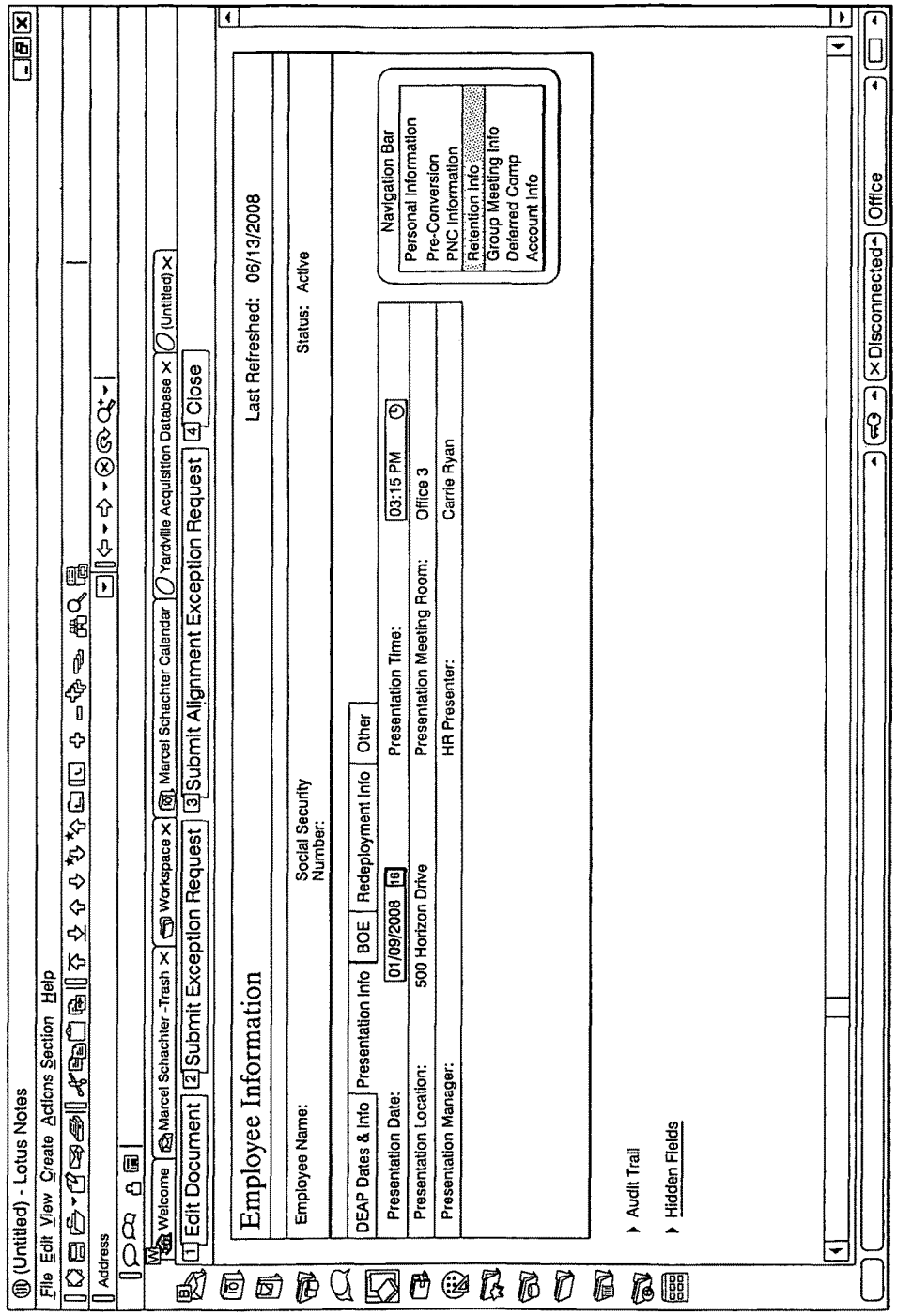
FIG. 17 illustrates one embodiment of a screen showing post-conversion data describing a retention information meeting for an employee.

FIGS. 16-20 illustrate embodiments of screens that may be provided to users of the migration system 102 (e.g., via the user interface 114) to indicate post-conversion data describing an employee's retention status and associated information. For example, FIG. 16 illustrates one embodiment of a screen 1600 showing post-conversion employee details regarding retention. For example, the screen 1600 may include a field 1602 indicating the employee's future employment status. This may be determined, for example, based on the application of the one or more translation tables by the translation utility 106 to the pre-conversion data. Other retention-related information derived by the translation utility 106 may also be shown at the screen 1600 including, for example, termination dates, severance program eligibility, severance payment amounts, retention bonus amounts, etc. FIG. 16A illustrates an alternate embodiment of the screen of 1600. FIG. 17 illustrates one embodiment of a screen 1700 showing post-conversion data describing a retention information meeting for an employee. Various details of the retention information meeting may be determined by the translation utility 106 based on the pre-conversion data and/or post-conversion data (e.g., the employee's retention status, the employee's work location, etc.). It will be appreciated that retention information meetings may be used to present employees with details of severance packages and/or retention bonuses that are offered. The presenter, room, and/or time of the meeting for any given employee may, for example, be based on whether the employee is to be retained or displaced.

Figure 18:
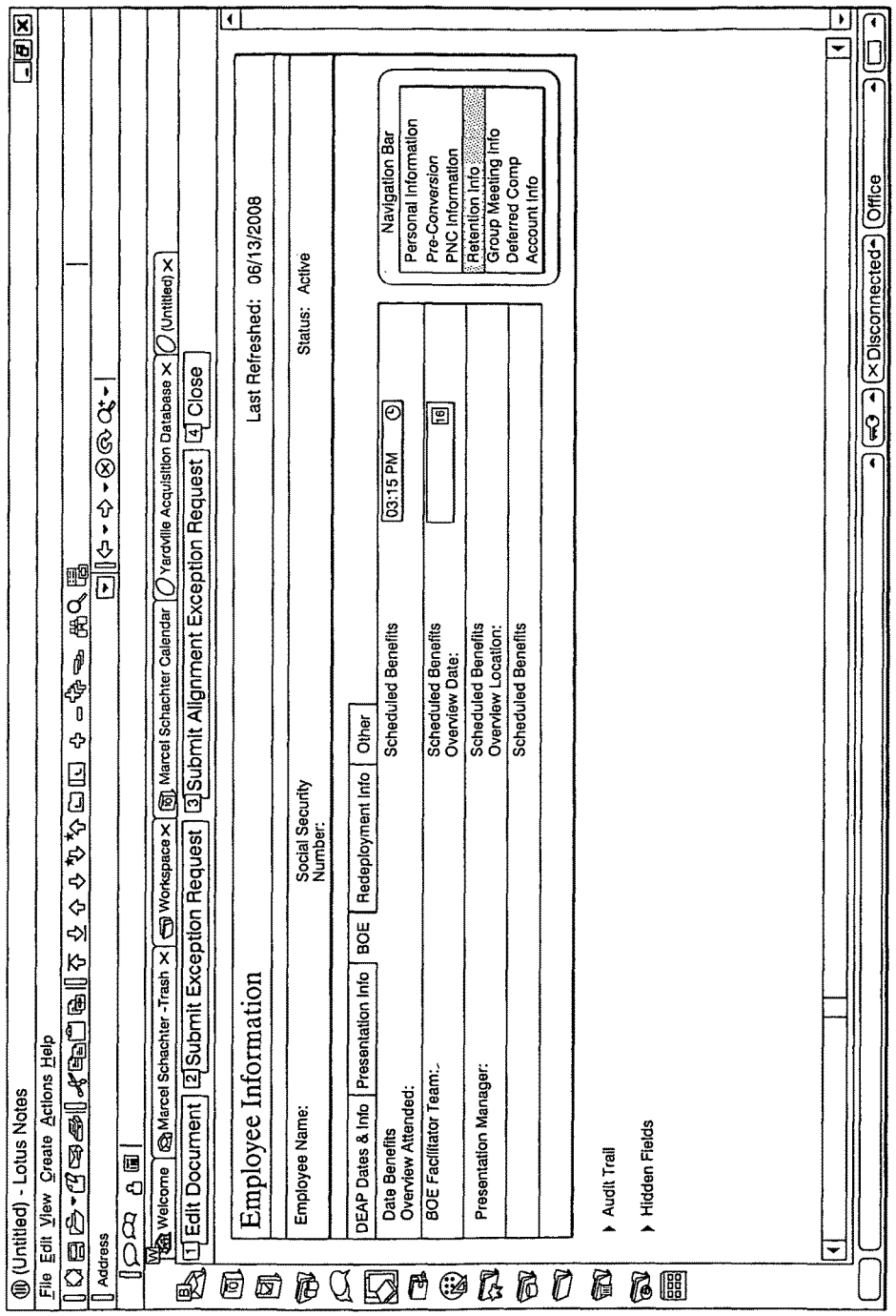
FIG. 18 illustrates one embodiment of screen showing post-conversion information regarding an employee's attendance at a benefits overview meeting.
Figure 19:
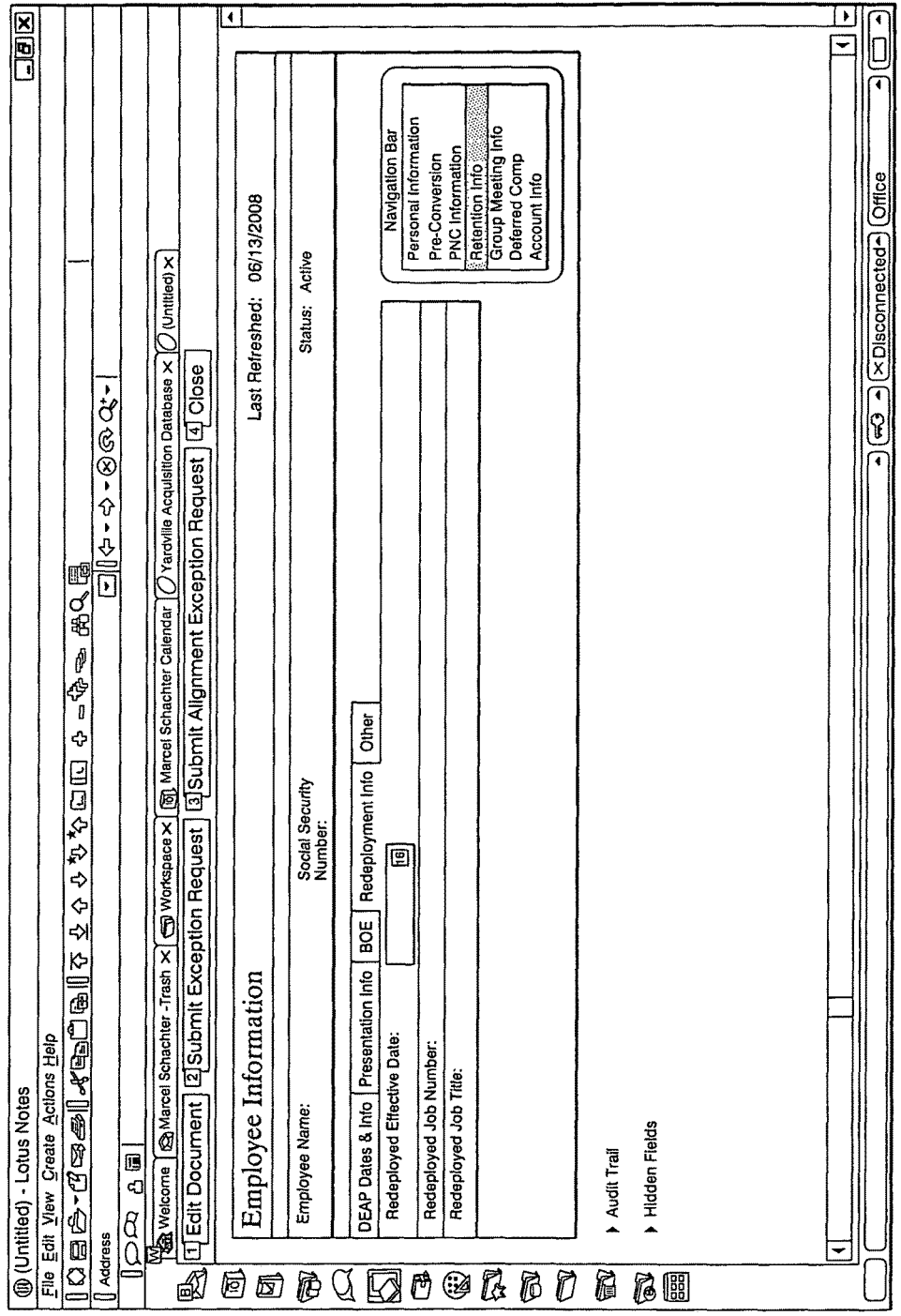
FIG. 19 illustrates one embodiment of a screen showing post-conversion information regarding an employee's redeployment.
Figure 20:
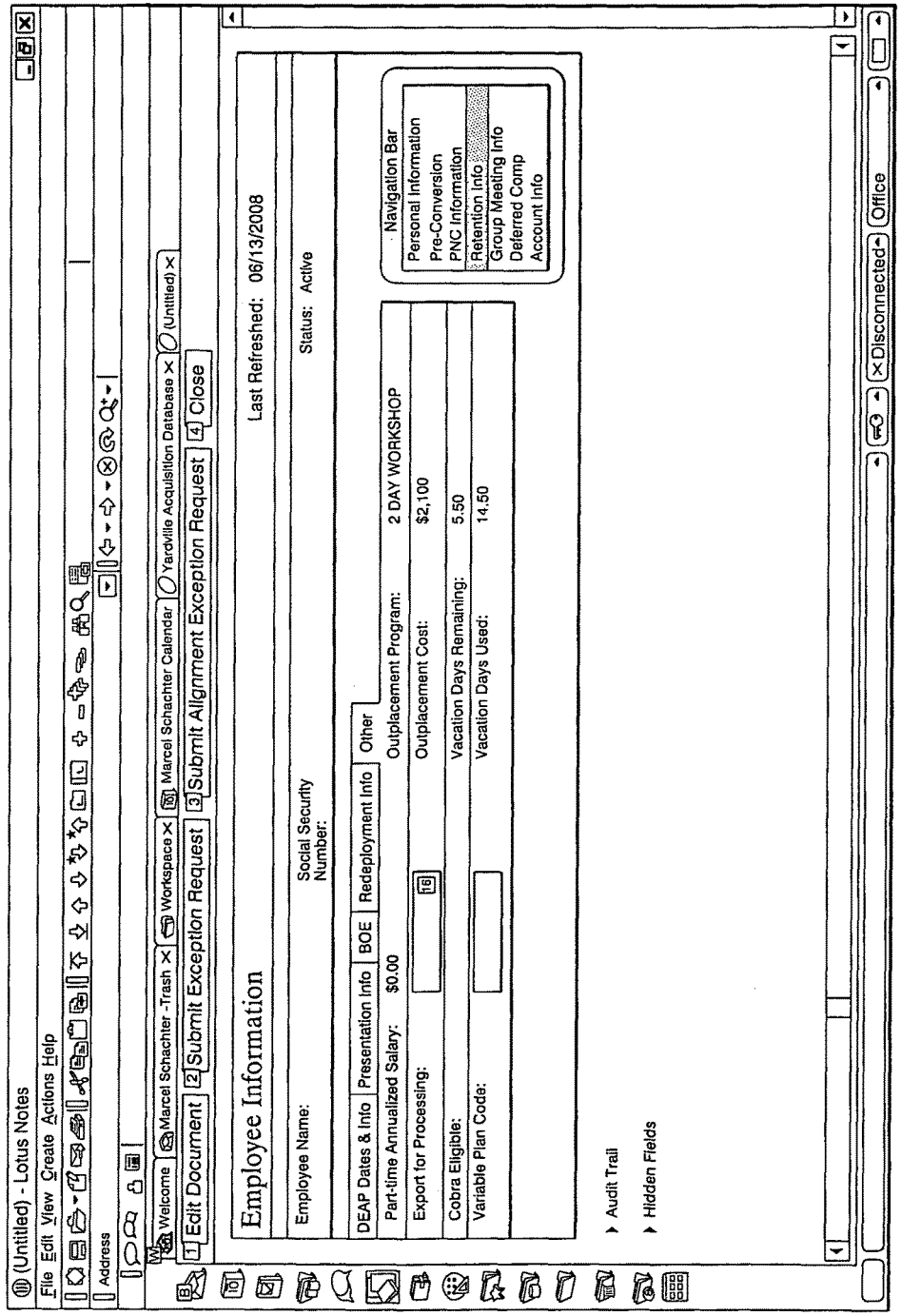
FIG. 20 illustrates one embodiment of a screen showing additional post-conversion data.

FIG. 18 illustrates one embodiment of screen 1800 showing post-conversion information regarding an employee's attendance at a benefits overview meeting. It will be appreciated that employees may be assigned to benefits overview meetings by the translation utility 106 based on the pre-conversion data. For example, employees having different post-conversion job descriptions may have different benefits and may be assigned to different benefits overview meetings accordingly. Also, for example, an employee whose post-conversion employment status is displaced may not be scheduled for a benefits overview meeting. FIG. 19 illustrates one embodiment of a screen 1900 showing post-conversion information regarding an employee's redeployment. For example, some employees, based on their pre-conversion information, may lose their current job but be offered a new job with different or slightly different responsibility. The translation utility 106 may determine which employees are to be redeployed, for example, based on the translation table or tables. FIG. 20 illustrates one embodiment of a screen 2000 showing additional post-conversion data. For example, the screen 2000 may indicate an employee's part-time salary, whether the employee is eligible for COBRA, whether the employee is eligible for outplacement training, the employee's vacation status, etc.

Figure 21:
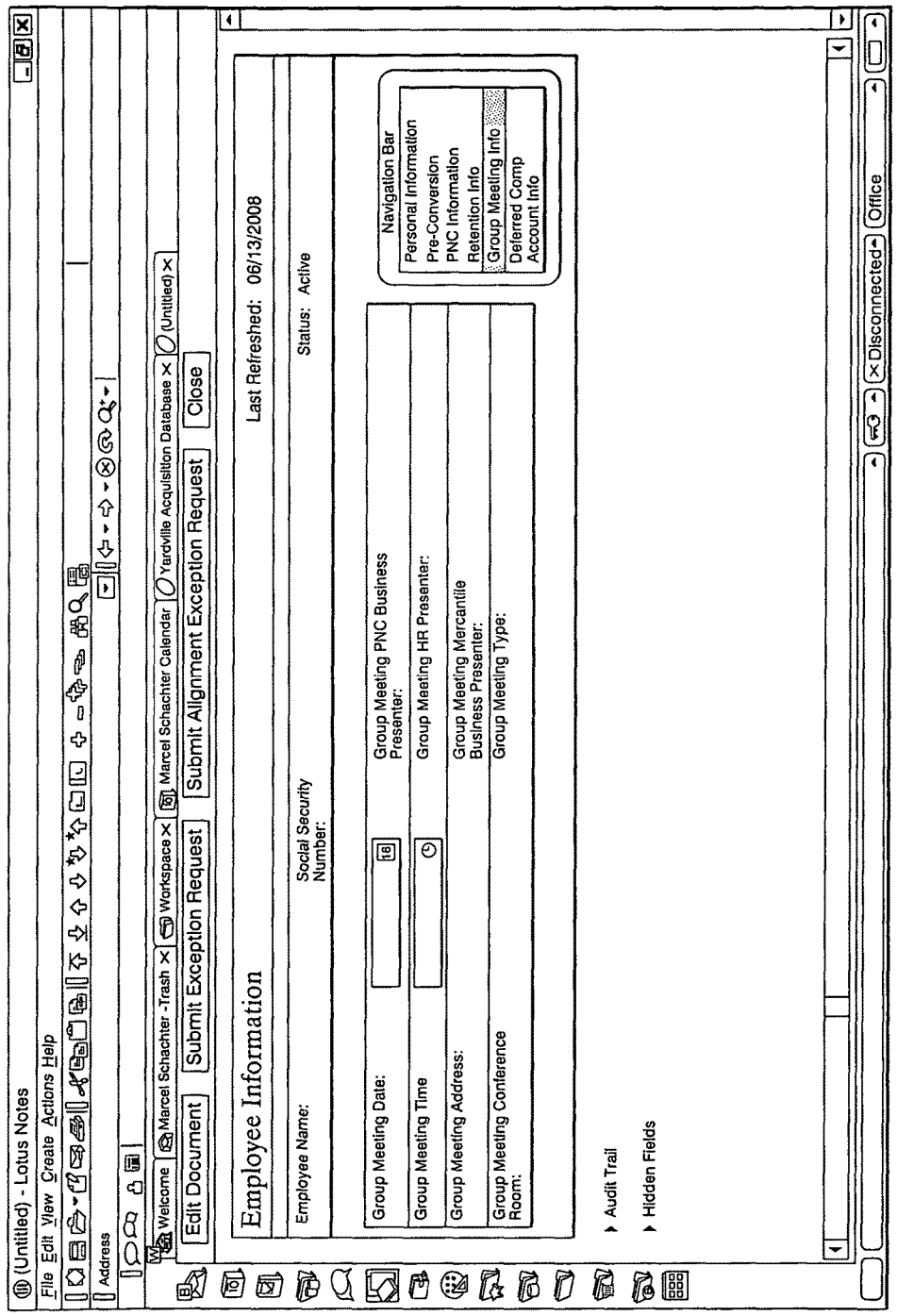
FIG. 21 illustrates one embodiment of a screen showing post-conversion group meeting data regarding an employee.
Figure 22:
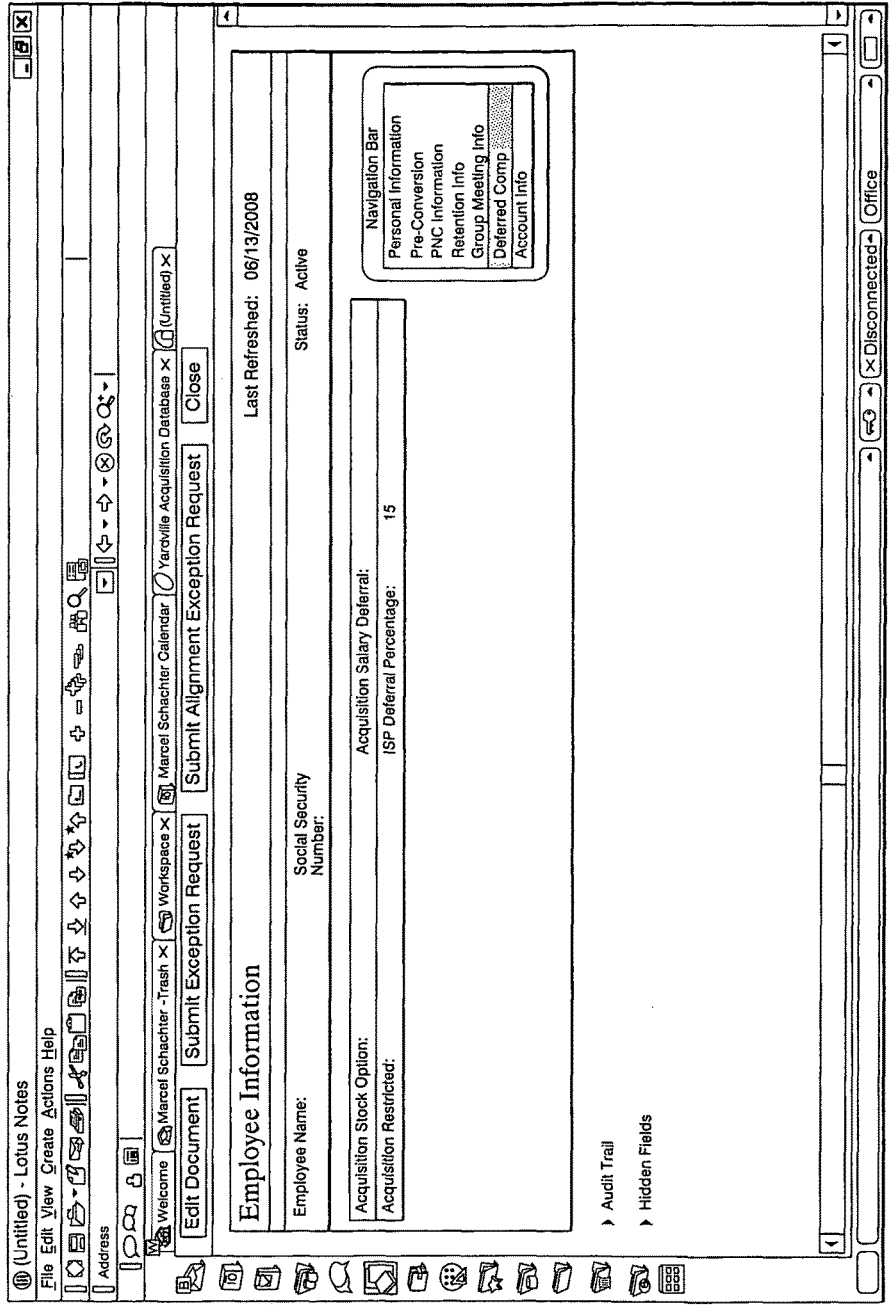
FIG. 22 illustrates one embodiment of a screen showing post-conversion deferred compensation information.
Figure 23:
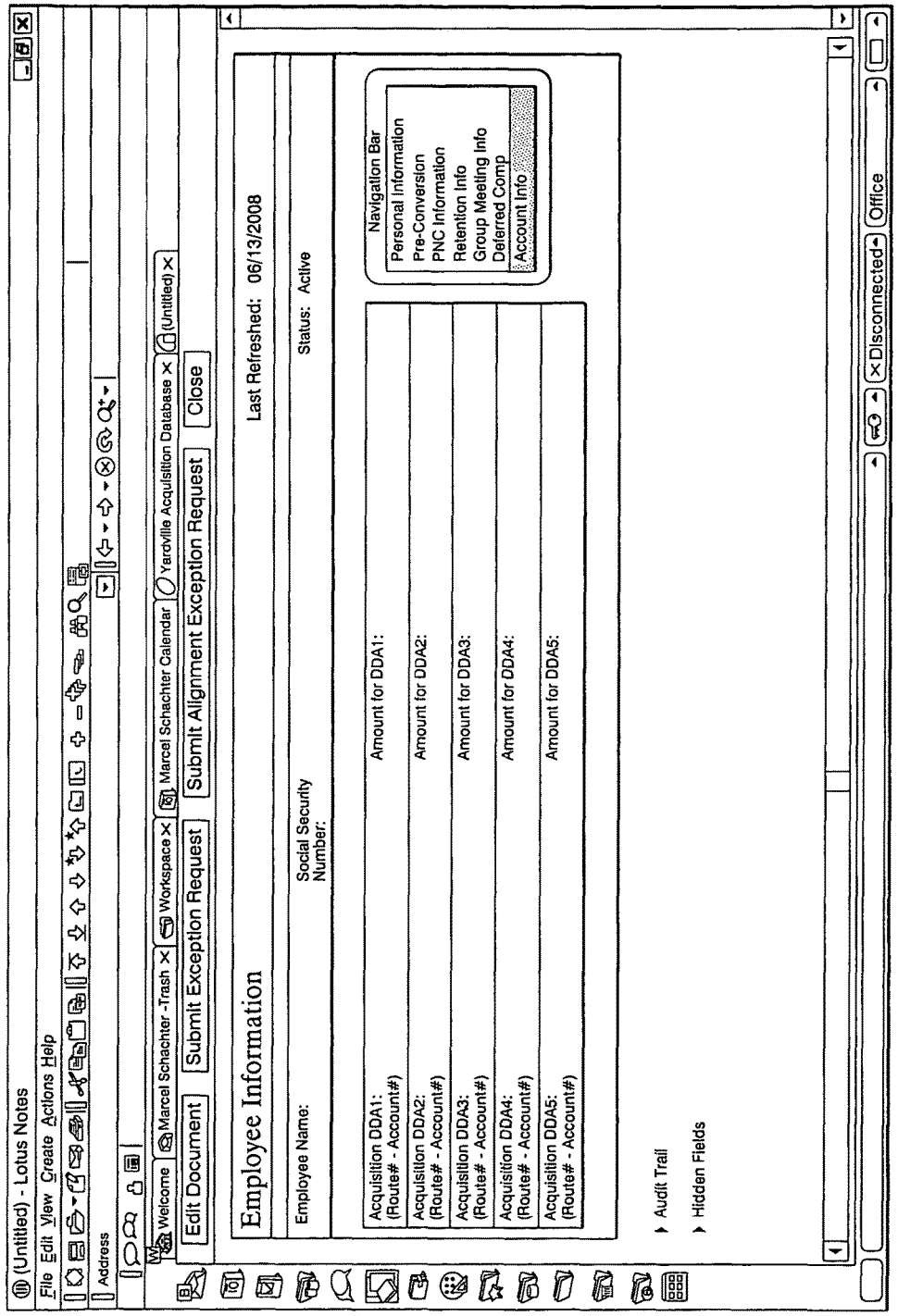
FIG. 23 illustrates one embodiment of a screen showing post-conversion accounts associated with an employee.

FIG. 21 illustrates one embodiment of a screen 2100 showing post-conversion group meeting data regarding an employee. For example, after a merger, an initial group meeting may be scheduled between members of each post-merger group. The translation utility 106 may assign employees to post-merger group meetings based, for example, on the post-merger group to which they belong and their post-merger location. FIG. 22 illustrates one embodiment of a screen 2200 showing post-conversion deferred compensation information. For example, the translation utility 106 may derive employees' entitlement to deferred compensation, such as stock options, based on their pre-conversion eligibility and, for example, on parameters of the stock of the newly merged company. FIG. 23 illustrates one embodiment of a screen 2300 showing post-conversion accounts associated with an employee. The post-conversion accounts may indicate one or more personal demand deposit accounts or other accounts into which the employee's compensation is to be deposited.

Figure 24:
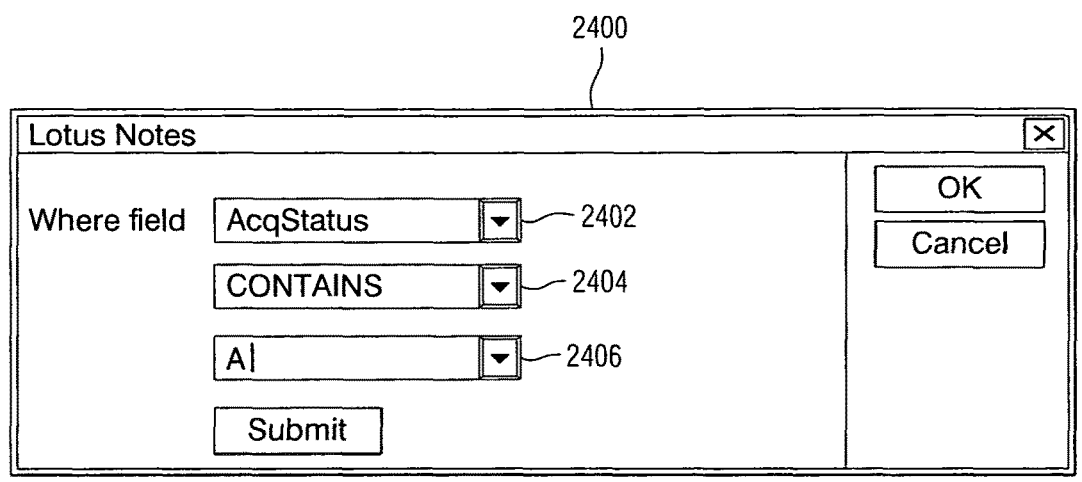

FIGS. 24-28 show screens illustrating one embodiment of a report generating interface. For example, the report generating interface may be provided to users of the migration system 102 via the user interface 114 and may call the functionality of the report utility 108. FIG. 24 illustrates one embodiment of a screen 2400 that may receive report parameters from a user. For example, the screen 2400 may allow a user to specify records to be included in a report generated by the report utility 108. A field 2402 may allow the user to select a field of the pre-conversion and/or post-conversion employee data that is the subject of the query. Field 2402 may be a drop-down menu listing some or all of the available fields from the employee data. Field 2404 may allow the user to select a comparator. The example comparator shown is "contains," however any suitable operator may be included in the drop-down menu (e.g., is equal to, is less than, does not contain, etc.). Argument field 2406 may allow the user to select a field value that will be used in conjunction with the field name and the comparator to select employee data to be returned. For example, in the example shown in FIG. 24, the report utility 108 may return records with "AcqStatus" fields containing the letter "A."

Figure 25:
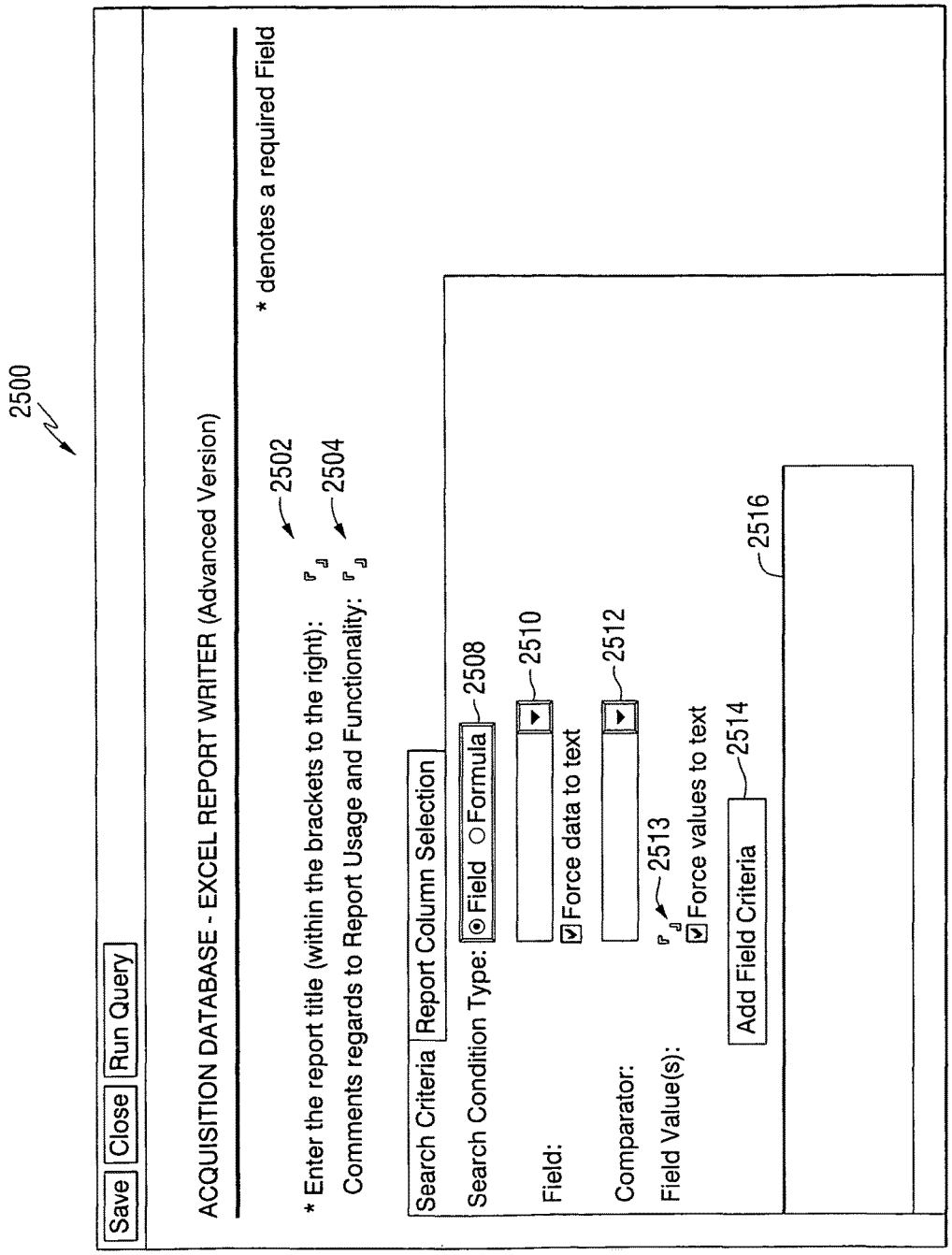

FIG. 25 illustrates a screen 2500 of an additional embodiment of the report generating interface. A user may indicate a report title and comments regarding the report at fields 2502 and 2504, respectively. A field 2508 may indicate the type of search condition. For example, a field condition, similar to that illustrated in FIG. 24, is shown in FIG. 25. Field 2510 may allow the user to select a field that will be the basis of the report search condition, for example, similar to the field 2402 in FIG. 24. A comparator field 2512 and field value field 2513 may also be provided, allowing the user to enter comparator and field value data for the condition. Once a search condition is generated utilizing fields 2508, 2510, 2512 and 2513, the user may add the condition to the report search by selecting button 2514. Window 2516 may list textual representations of accepted report search conditions. FIG. 26 illustrates the screen 2500 after a search condition has been received and listed at window 2516. As shown in FIG. 26, the screen 2500 includes an addition And/Or field 2602. This field may allow the user to indicate whether a newly entered condition is to be an additional condition (and) or an alternative condition (or). FIG. 27 illustrates one embodiment of the screen 2500 with the "formula" input selected from field 2508. Accordingly, the screen 2500 may include a formula input field 2702 where the user may (e.g., textually) enter an indication of an input formula. The formula may be added to the search conditions by selecting button 2514.

FIG. 28 illustrates one embodiment of a screen 2800 for allowing a user to select the format of a report generated according to the conditions described above (e.g., in EXCEL or another spreadsheet format). For example, the screen 2500 described above may receive input for allowing the report utility 108 to select the employee records to be included in the report. The screen 2800 may receive inputs defining the format of the report. In various embodiments, the report may comprise a plurality of columns. Each column may correspond to a field from an employee record included in the report. A field name field 2808 may allow the user to select the employee record field that will be the basis of a column. A column type field 2806 may allow a user to specify whether a column will include a straight value of the field, a formula based on the value of the field, and/or text indicating the value of the field. Selecting the Add button 2807 may cause the column indicated at fields 2806 and 2808 to be added to a list 2810 of columns to be included in the report.

FIG. 29 illustrates one embodiment of a report 2900 generated by the report utility 108. The report 2900 comprises a plurality of columns 2902, 2904, 2906, 2908, 2910. Column 2902 lists employee names. Column 2904 lists employee social security numbers, column 2906 lists employee department identification numbers. Column 2908 lists employee department names; and column 2910 lists employee job titles.

Development and use of the systems and methods have provided several unpredictable benefits that were not expected prior to development. First, aspects of the systems and methods have proven useful in other contexts. For example, the import utility described herein has been put to use importing data into non-acquisition-related databases. Also, for example, the translation utility described herein has proven useful for translation tasks with non-acquisition-related databases. Further, other elements of the systems and methods including, for example, the import utility can be used in non-acquisition database contexts.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

In general, it will be apparent to one of ordinary skill in the art that various embodiments described herein, or components or parts thereof, may be implemented in many different embodiments of software, firmware, and/or hardware, applications, or modules thereof. The software code or specialized control hardware used to implement some of the present embodiments is not limiting of the present invention. It can also be appreciated that certain process aspects described herein may be performed using instructions stored on a computer-readable memory medium or media that direct a computer system to perform process steps. For example, the embodiments described hereinabove may be implemented in computer software using any suitable computer software language type such as, for example, C, C#, .NET, SQL, MySQL, HTML, or C++ using, for example, conventional or object-oriented techniques. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site).

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable memory medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A computer system for migrating human resources data from a first human resources data system to a second human resources data system, the computer system comprising at least one processor, operatively associated memory and a target database in communication with the at least one processor, wherein the computer system is programmed to execute:

an import utility programmed to:
receive first data from the first human resources system, the first human resources system comprising human resources information from a first business entity that was merged with or acquired by a second business entity for which the second human resources data system corresponds, wherein the first data comprises, for each of a plurality of employees of the first entity, a set of employee attributes according to a format of the first human resources data system;

a translation utility programmed to:
apply a translation table to the first data to generate translated data according to a target format, wherein the translation table comprises a mapping of employee attribute types according to the first human resources data system format to corresponding employee attribute types according to the target format;
generate for the first employee a new computer network credential selected from the group consisting of a network log-in and an e-mail address;
store the translated data at the target database; and
display a translation screen comprising a translation definition field configured to allow a user to at least one of view and modify parameters of the translation table, the parameters comprising a source server and a source database to allow a user to indicate a location of the target database to be translated;

an export utility programmed to:
generate an export file comprising the translated data arranged according to a second human resources data system format; and a reports utility programmed to:
receive from a user a request to generate a report comprising at least one requested employee attribute type in the first human resources data system format, the second human resources data system format and the target format;

derive at least one employee attribute from at least one other employee attribute stored at the target database; and provide to the user the report comprising the at least one derived employee attribute, and wherein the report is based on the translated data in the target database that was translated from employee attribute types according to the first human resources data system format to corresponding employee attribute types according to the target format;

wherein a preliminary translation is performed and the first data, before or after the preliminary translation, is used by the reports utility to generate an additional report.

2. The system of claim 1, wherein the translation utility is further programmed to:

determine whether each of a plurality of employee attribute types according to the target format correspond to each of the employee attribute types according to the first human resources data system format contained in the first data in the translation table; and upon determining that at least one employee attribute type of the employee attribute types according to the target format has no corresponding employee attribute type according to the first human resources data system format in the translation table, derive the at least one employee attribute type according to the target format based on at least one employee attribute type of the employee attribute types according to the first human resources data system format such that the translation table contains no non-corresponding entries.

3. The system of claim 1, wherein generating the export file comprising the translated data arranged according to the second human resources data system format comprises ordering the translated data to be read by the second human resources data system.

4. The system of claim 1, wherein the translation table defines a first employee attribute type not included in the first data in terms of at least a second employee attribute type that is included in the first data, and wherein applying the translation table to the first data to generate the translated data comprises finding a value for the first employee attribute type for each of the plurality of employees.

5. The system of claim 4, wherein the first employee attribute type indicates whether an employee is full-time or part-time and wherein the second employee attribute type indicates a number of hours per week worked by the employee.

6. The system of claim 1, wherein the import utility is also for receiving the translation table.

7. The system of claim 1, wherein the export utility is also for receiving a request for a file, wherein the request defines the second human resources data system format, and wherein the second human resources data system format defines a plurality of fields of the translated data to be included in the requested file.

8. The system of claim 1, wherein the translation table defines at least one equivalency between an original employee attribute type from the first human resources data system format and a new employee attribute type from the target format and derivation data describing at least a second new employee attribute type from the target format in terms of a plurality of employee attribute types in the first human resources data system format.

9. The system of claim 1, wherein the reports utility is further programmed to receive a selection of at least one employee attribute type according to the target format from a drop down menu.

10. The system of claim 1, wherein the reports utility is further programmed to receive a selection of at least one comparator.

11. The system of claim 1, wherein the translation utility is further programmed to display a change log.

12. A computer-implemented method for migrating human resources data from a first human resources data system to a second human resources data system, the method comprising:

receiving first data from the first human resources system, the first human resources system comprising human resources information from a first business entity that was merged with or acquired by a second business entity for which the second human resources data system corresponds, wherein the first data comprises, for each of a plurality of employees of the first entity, a set of employee attributes according to a format of the first human resources data system;

applying a translation table to the first data to generate translated data according to a target format, wherein the translation table comprises a mapping of employee attribute types according to the first human resources data system format to corresponding attribute types according to the target format;

storing the translated data at a target database;

displaying a translation screen comprising a translation definition field configured to allow a user to at least one of view and modify parameters of the translation table, the parameters comprising a source server and a source database to allow a user to indicate a location of the target database to be translated;

generating an export file comprising the translated data arranged according to a second human resources data system format;

generating, for the first employee, a new computer network credential selected from the group consisting of a network log-in and an e-mail address;

receiving from a user a request to generate a report comprising at least one requested employee attribute type in the first human resources data system format, the second human resources data system format and the target format;

deriving at least one employee attribute from at least one other employee attribute stored at the target database; and providing to the user the report comprising the at least one derived employee attribute, and wherein the report is based on the translated data in the target database that was translated from employee attribute types according to the first human resources data system format to corresponding attribute types according to the target format;

wherein the applying a translation table further comprises performing a preliminary translation, wherein the first data is used by the reports utility to generate an additional report.

13. The method of claim 12, further comprising:

determining whether each of a plurality of employee attribute types according to the target format correspond to each of the employee attribute types according to the first human resources data system format contained in the first data in the translation table; and upon determining that at least one employee attribute type of the employee attribute types according to the target format has no corresponding employee attribute type according to the first human resources data system format in the translation table, deriving the at least one employee attribute type according to the target format based on at least one employee attribute type of the employee attribute types according to the first human resources data system format such that the translation table contains no non-corresponding entries.

14. The method of claim 12, wherein generating the export file comprising the translated data arranged according to the second human resources data system format comprises ordering the translated data to be read by the second human resources data system.

15. The method of claim 12, wherein the translation table defines a first employee attribute type not included in the first data in terms of at least a second employee attribute type that is included in the first data, and wherein applying the translation table to the first data to generate the translated data comprises finding a value for the first employee attribute type for each of the plurality of employees.

16. The method of claim 15, wherein the first employee attribute type indicates whether an employee is full-time or part-time and wherein the second employee attribute type indicates a number of hours per week worked by the employee.

17. The method of claim 12, further comprising receiving the translation table at a server specified by a user.

18. The method of claim 12, further comprising receiving a request for a file, wherein the request defines the second human resources data system format, and wherein the second human resources data system format defines a plurality of fields of the translated data to be included in the requested file.

19. The method of claim 12, wherein the translation table defines at least one equivalency between an original employee attribute type from the first human resources data system format and a new employee attribute type from the target format and derivation data describing at least a second new employee attribute type from the target format in terms of a plurality of employee attribute types in the first human resources data system format.

20. The method of claim 12, further comprising receiving a selection of at least one employee attribute type according to the target format from a drop down menu.

21. The method of claim 12, further comprising receiving a selection of at least one comparator.

22. The method of claim 12, further comprising displaying a change log.

* * * * *